US011486409B2

(12) United States Patent
Ting et al.

(10) Patent No.: US 11,486,409 B2
(45) Date of Patent: Nov. 1, 2022

(54) SYSTEM AND METHOD FOR PREVENTING TOTAL PLANT SHUTDOWN DUE TO LOW TEMPERATURE EXCURSION

(71) Applicant: WPT LLC, Houston, TX (US)

(72) Inventors: Tiong-Ee Ting, Houston, TX (US); Kenneth M. Istre, Sulphur, LA (US); Newton Landreneau, Moss Bluff, LA (US); W. Ryan Pitt, Lake Charles, LA (US); Gregory M. Guillory, Jr., Lake Charles, LA (US); Charles R. Demarest, Lake Charles, LA (US); Toby Darbonne, Sulphur, LA (US); Troy L. Irwin, Iowa, LA (US)

(73) Assignee: WPT LLC, Houston, TX (US)

( * ) Notice: Subject to any disclaimer, the term of this patent is extended or adjusted under 35 U.S.C. 154(b) by 856 days.

(21) Appl. No.: 16/397,891

(22) Filed: Apr. 29, 2019

(65) Prior Publication Data

US 2019/0257316 A1  Aug. 22, 2019

Related U.S. Application Data

(63) Continuation-in-part of application No. 14/065,049, filed on Oct. 28, 2013, now Pat. No. 10,274,907.

(51) Int. Cl.
*F04D 27/02*    (2006.01)
*G05B 13/02*    (2006.01)
(Continued)

(52) U.S. Cl.
CPC ........... *F04D 27/0284* (2013.01); *B01D 3/00* (2013.01); *C10G 7/12* (2013.01); *F04D 27/004* (2013.01);
(Continued)

(58) Field of Classification Search
CPC ... F04D 27/004; F04D 27/0284; F25J 1/0238; F25J 2215/62; F25J 2280/02; B01D 3/00;
(Continued)

(56) References Cited

U.S. PATENT DOCUMENTS 3,997,109 A    12/1976  Hays
4,064,392 A    12/1977  Desalu
(Continued)

FOREIGN PATENT DOCUMENTS

CN    202420113    9/2012

OTHER PUBLICATIONS

Zhang, J. et al., 2010, Industrial and Engineering Chemistry Research, 49, 5786-5799. https://doi.org/10.1021/ie100455g.*

*Primary Examiner* — Brian A McCaig
(74) *Attorney, Agent, or Firm* — Schultz & Associates, P.C.

(57) ABSTRACT

A system of interlocks for controlling flow of low temperature process streams in a manufacturing process through a cold box to equipment or piping not specified for such temperatures by opening and closing valves and starting and stopping pumps. At least one interlock affects streams heated in the cold box. At least one interlock affects the streams cooled in the cold box. The interlocks are activated by temperatures of process lines to prevent exposure of equipment and piping to low temperatures while preventing the shutdown of the cold box. An override controller including a predictive failure capability is also provided.

21 Claims, 16 Drawing Sheets

(51) Int. Cl.
  *F04D 27/00* (2006.01)
  *C10G 7/12* (2006.01)
  *B01D 3/00* (2006.01)
  *F25J 1/02* (2006.01)

(52) U.S. Cl.
  CPC .......... *F25J 1/0238* (2013.01); *G05B 13/027* (2013.01); *C10G 2300/4006* (2013.01); *F25J 2215/62* (2013.01); *F25J 2280/02* (2013.01)

(58) Field of Classification Search
  CPC ... B01D 3/14; B01D 3/32; B01D 3/42; G05B 13/027; C10G 7/12; C10G 2300/4006
  See application file for complete search history.

(56) References Cited

U.S. PATENT DOCUMENTS

| | | |
|---|---|---|
| 4,233,817 A | 11/1980 | Toth |
| 4,313,310 A | 2/1982 | Kobayashi et al. |
| 4,488,239 A | 12/1984 | Agarwal |
| 4,547,977 A | 10/1985 | Tenedini et al. |
| 4,742,131 A | 5/1988 | Asanuma et al. |
| 4,744,408 A | 5/1988 | Pearson et al. |
| 5,014,910 A | 5/1991 | Koch et al. |
| 5,152,966 A | 10/1992 | Roe et al. |
| 6,165,418 A | 12/2000 | Anderson et al. |
| 6,235,852 B1 | 5/2001 | Hess et al. |
| 6,252,016 B1 | 6/2001 | Wu et al. |
| 6,293,514 B1 | 9/2001 | Pechoux et al. |
| 6,487,876 B2 | 12/2002 | Howard et al. |
| 6,938,433 B2 | 9/2005 | Bash et al. |
| 7,775,268 B2 | 8/2010 | Sato et al. |
| 8,406,928 B2 | 3/2013 | Gupta et al. |
| 2003/0225466 A1 | 12/2003 | Yulevitch et al. |
| 2005/0072174 A1 | 4/2005 | Beers |
| 2006/0074599 A1 | 4/2006 | Emigholz et al. |
| 2009/0062495 A1 | 3/2009 | Cheluget et al. |
| 2010/0262301 A1 | 10/2010 | Schwartz et al. |

\* cited by examiner

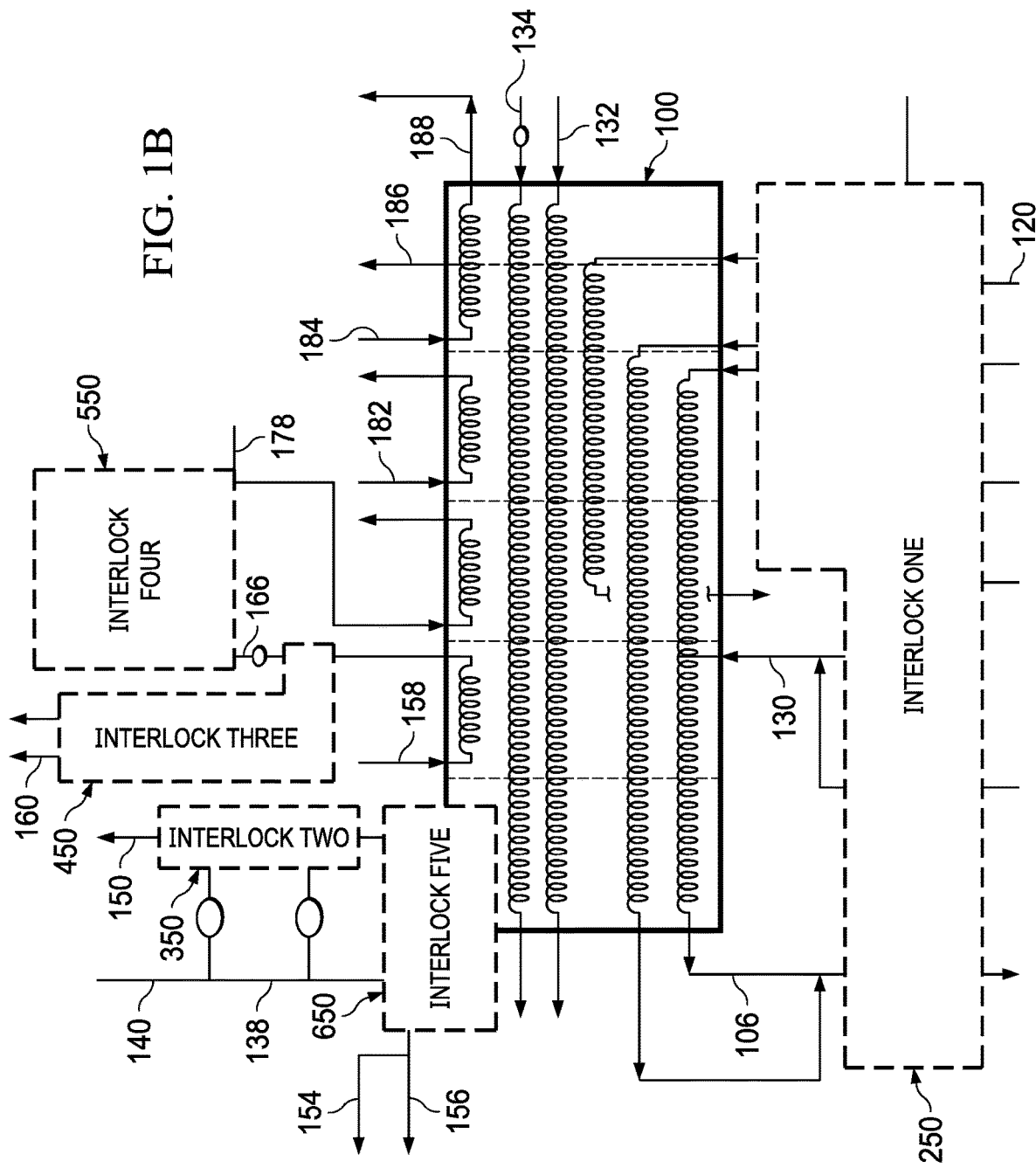

```
class InterlockNeural():

def __init__(self):
        #setting node weights – starting weight is any value between -1 and 1
        node.synaptic_weights = numpy.array([[.3,.4,0,-.3,-.4]])

def sigmoid(self, x):
        #sigmoid function
          return 1 / (1 + numpy.exp(-x))

def sigmoid_derivative(self, x):
        #derivative of sigmoid function
          return x * (1 - x)

def train(self, training_inputs, training_outputs, training_iterations):

#training the model
        for iteration in range(training_iterations):
                output = self.train(training_inputs)
                error = training_outputs - output
                adjustments = numpy.dot(training_inputs.T, error * self.sigmoid_derivative(output))
                        node.synaptic_weights += adjustments def train(self, inputs):

passing inputs through the node
                inputs = inputs.astype(float)
                output = self.sigmoid(np.dot(inputs, self.synaptic_weights))
                return output if __name__ == "__main__":

initializing
        neural_network = InterlockNeural()

#training data consisting of 4 examples--5 input values and 1 output
        #in practice this array will hold a running accumulation of interlock failure data from the interlock
failure data table
        training_inputs = numpy.array([[0,1,1,0,1],
                                [0,0,0,0,0],
                                [0,0,0,0,0],
                                [0,0,0,0,0]])

training_outputs = numpy.array([[0,0,0,1]]).T training neural network
        neural_network.train(training_inputs, training_outputs, 100000)
```

FIG. 14

SYSTEM AND METHOD FOR PREVENTING TOTAL PLANT SHUTDOWN DUE TO LOW TEMPERATURE EXCURSION

This application is a continuation-in-part of U.S. application Ser. No. 14/065,049 filed Oct. 28, 2013, now U.S. Pat. No. 10,274,907 granted on Apr. 30, 2019. The patent application identified above is incorporated here by reference in its entirety to provide continuity of disclosure.

FIELD OF THE DISCLOSURE

The present disclosure relates to a system and method to prevent shutdown of manufacturing processes due to abnormal low temperatures encountered in a refrigeration system by the use of safety interlocks.

BACKGROUND

Ethylene is a colorless flammable gas with a formula of $C_2H_4$. Ethylene is a basic chemical that is used widely for production of ethylene derivative chemicals. Major industrial reactions using ethylene include polymerization, oxidation, halogenation and hydro halogenation, alkylation, hydration, oligomerization and hydroformylation.

Ethylene is produced in the petrochemical industries from various types of feedstocks such as ethane, propane, ethane-propane mix, butane, naphtha, etc. through the process of steam cracking or in the oil refineries by cracking over zeolite catalysts. Typical process design in the production of ethylene includes feed treating, steam cracking, heat recovery, acid gas treatment, cracked gas compression, cold fractionation and hot fractionation.

In the cold fractionation process, due to the extremely cold temperatures, aluminum heat exchangers are usually used because of the compatibility of their metallurgy with various other interconnected parts of the system. In addition, aluminum heat exchangers are effective in lowering overall equipment count and capital investment required for an ethylene manufacturing plant.

In general, the aluminum heat exchangers are used to transfer heat between multiple streams in a "cold box." Heat exchangers can be used alone or in combination in the same cold box. Usually, the "hot streams" connected to the aluminum heat exchangers come from various levels of refrigeration and transfer heat to "cold streams" from cold service process equipment.

While operating, temperatures across an aluminum heat exchanger can range from approximately −350° F. to approximately 160° F., depending on the plant design. Such a great temperature range induces tremendous thermal stresses. The thermal stresses often lead to premature aging of the aluminum heat exchanger and fracture failure.

In order to overcome the problem of failure, the prior art has responded by reinforcing the mechanical design of the aluminum heat exchangers. However, despite design improvements, the process piping and equipment connecting to the outlet streams of the aluminum heat exchangers are often made of inferior materials, such as ductile iron or carbon steel. Inferior materials are not a problem so long as the system operates in normal temperature ranges. However, the inferior materials can lead to catastrophic failure when exposed to extremely low temperatures, which sometimes result from abnormal plant operating conditions. Such catastrophic failure results in plant shut down and can result in injury to plant personnel. Superior materials for process piping, such as stainless steel, are available which can operate safely across larger temperature ranges, such as below −20° F., but they are extremely expensive and difficult to fabricate.

Examples of manufacturing processes which involve low temperatures are found in the prior art but they do not solve the problems inherent in abnormally low process temperatures. U.S. Pat. No. 5,361,589 to Howard, et al. discloses an ethylene recovery system with cracked gas cooled to about −20° F. to −40° F. However, Howard does not disclose how to control temperatures to protect process piping and equipment during abnormal operating conditions where lower temperatures are experienced.

U.S. Pat. No. 5,979,177 to Summer, et al. discloses an ethylene plant refrigeration system where the gas feed is cooled to about −31° F. to −35° F. However, Summer does not disclose how to monitor stream temperatures and control temperatures to protect process piping and equipment during abnormal low temperature conditions.

U.S. Pat. No. 4,900,347 to McCue, et al. discloses a method for recovering ethane or ethylene from cracking gas requiring low temperature refrigeration. At least one portion of the disclosed method has process temperatures below −20° F. However, McCue does not disclose how temperatures of process streams are monitored or modified in response to abnormal low temperature conditions.

Other prior art demonstrates methods to monitor and control process temperatures. However, none of the methods have been entirely satisfactory in controlling abnormal low process temperatures while protecting process piping and equipment.

U.S. Pat. No. 4,488,239 to Agarwal discloses a system to control temperatures in an olefin oxidation reactor by incrementally adjusting the flow rate of coolant to the chemical reactor based on measured temperatures. However, Agarwal does not disclose control of streams based on abnormally low process temperatures around the reactor to protect process lines and equipment.

United States Patent Publication No. 2010-0262301 filed by Schwartz, et al. discloses a method for controlling a process flow rate through an aluminum heat exchanger by adjusting a bypass. However, Schwartz does not disclose the use of redirection or flow stoppages.

SUMMARY

Aluminum heat exchangers are often used in an ethylene processing plant for transferring heat between multiple process streams. Such aluminum heat exchangers can be operated in a single unit or in multiple units arranged in series or in parallel. Arrangement of the process streams in an aluminum heat exchanger is done so as to prevent a large temperature differential. A high temperature differential can stress the mechanical integrity of the aluminum heat exchanger, leading to fatigue and failure.

Advancement in the technology has improved the design of the aluminum heat exchangers. But, such improvements fail to compensate for the impact of cold process liquid leaving the aluminum heat exchanger during transient operating conditions and the resulting impact on downstream equipment and piping. Downstream equipment and piping is often constructed of carbon steel materials. Carbon steel is not compatible with extremely cold temperatures and when exposed to them becomes dangerously brittle.

In order to protect process piping and downstream equipment from abnormally low process temperatures while preventing process shutdown, a method and system is disclosed which provides for monitoring and controlling the temperatures of various streams based on a set of predetermined high and low temperatures. Temperature sensors are connected through controllers to valves and/or pumps on the heating and cooling streams. The sensors, controllers and valves and/or pumps are known as "interlocks." When abnormal process temperatures occur, the interlocks open or close valves that are part of the interlock and/or turn on or off pumps that are part of the interlock in order to redirect, stop or bypass certain streams. Multiple interlocks may be used in relation to a cold box. Each interlock may be activated independently. Each of the interlocks may be set to activate at the same temperature or at different temperatures based on the construction material for the equipment and piping they are designed to protect. Location of the interlocks, pumps, and valves in the system and careful control of their functions and temperature settings prevent a shutdown of flow through the cold box and allow the system to continue operating until the temperatures reach normal conditions. Hence, damage to the aluminum heat exchangers and downstream piping is avoided while also avoiding expensive system shutdown.

The disclosure includes multiple temperature sensors located at different locations in the process, such as when the heating and cooling streams leave the cold box. Further, temperature sensors can be connected to multiple valve controllers and pump controllers such that multiple actions, such as opening or closing multiple valves and tuning off of different pumps, can occur based on a single temperature reading.

It should be understood that the invention is not limited to use in ethane and propane streams in an ethylene process. Other processes which can benefit from the invention include air separation, extraction of natural gas liquids, and other cryogenic processes.

BRIEF DESCRIPTION OF THE DRAWINGS

In the detailed description of the preferred embodiments presented below, reference is made to the accompanying drawings.

FIG. 1B is a flow sheet diagram of an embodiment of a cold box process showing the location of different interlocks.

FIG. 14 is a code listing of a training method of an artificial neural network of a preferred embodiment.

DETAILED DESCRIPTION OF THE PREFERRED EMBODIMENT

In the description that follows, like parts are marked throughout the specification and figures with the same numerals, respectively. The figures are not necessarily drawn to scale and may be shown in exaggerated or generalized form in the interest of clarity and conciseness.

Figure 1A:
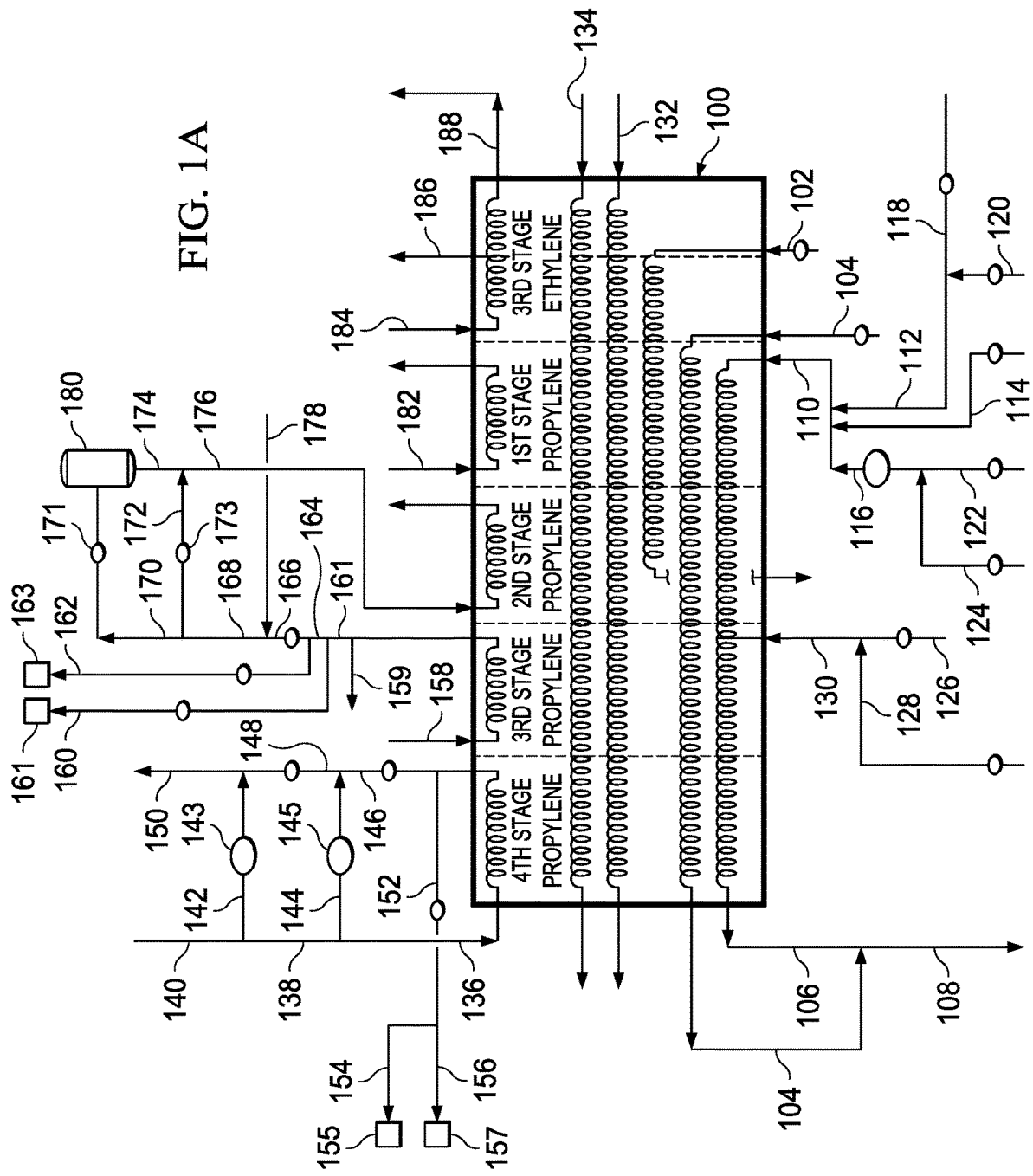
FIG. 1A is a flow sheet diagram of an embodiment of a cold box process.

FIG. 1A is a flow sheet diagram for an embodiment of a cold box 100 used in an ethylene production process. In the preferred embodiment, the composition of the streams is the majority component, however, other compounds may be found in the disclosed streams.

Entering stream 140 contains liquid propylene. Stream 140 splits into stream 138 and stream 142. Stream 138 splits into stream 136 and stream 144.

Stream 136 flows through cold box 100 as part of the fourth stage of the propylene refrigeration system. After leaving cold box 100, stream 136 splits into streams 152 and 146. Stream 152 further splits into streams 154 and 156. Streams 154 flows into aluminum heat exchanger 155. Stream 156 flows into aluminum heat exchanger 157.

Stream 144 flows through aluminum heat exchanger 145 and joins stream 146 to form stream 148.

Stream 142 flows through aluminum heat exchanger 143 and joins stream 148 to form stream 150. Stream 150 flows to a tank (not shown) before continuing to the third stage of the propylene refrigeration system.

Stream 158 flows from a tank (not shown) between the fourth stage and the third stage of the propylene refrigeration system and contains liquid propylene. Stream 158 flows through cold box 100 as part of the third stage of the propylene refrigeration system. After leaving cold box 100, stream 158 splits into streams 159 and 161. Stream 159 flows to a liquid drain system (not shown). Stream 161 splits into streams 160 and 164. Stream 160 flows to aluminum heat exchangers 161. Stream 164 splits into streams 162 and 166. Stream 162 flows to aluminum heat exchanger 163.

Stream 166 is joined by stream 178 to form stream 168. Stream 178 is propylene coming from other aluminum heat exchangers (not shown).

Stream 168 splits into streams 170 and 172. Stream 170 flows to tank 180 through heat exchanger 171. Stream 172 follows through heat exchanger 173 and is a bypass of tank 180.

Stream 174 flows from tank 180 and joins with stream 172 to form stream 176. Stream 176 is liquid propylene and flows through cold box 100 as part of the second stage of the propylene refrigeration system.

Stream 182 contains liquid propylene. Stream 182 flows through cold box 100 as part of the first stage of the propylene refrigeration system.

Stream 184 contains liquid ethylene and enters cold box 100 as part of the third stage of the ethylene refrigeration system. Stream 184 flows and splits into streams 186 and 188 which both exit cold box 100.

Stream 134 contains methane which is to be used as fuel gas and flows through cold box 100.

Stream 132 contains hydrogen offgas going to a methanator and flows through cold box 100.

Stream 102 is natural gas liquids (NGL) from the bottom of a demethanizer and flows through cold box 100.

Stream 104 is a liquid vapor ethane mixture from a feed splitter (not shown) and flows through cold box 100.

Stream 118 is vapor ethane from a feed splitter reflux drum. Stream 120 is liquid ethane from feed dryers. Stream 118 and stream 120 combine to form stream 112.

Stream 114 is vaporized ethane that comes from a deethanizer overhead and acetylene converter.

Stream 122 comes from ethylene splitter and contains liquid ethane. Stream 124 comes from the ethylene splitter overhead and is vaporized. Streams 122 and 124 combine to form stream 116.

Streams 112, 114, and 116 combine to form stream 110. Stream 110 flows through cold box 100.

Stream 126 consists of a mixture of liquid and vapor propane from the liquid propane recycle from propylene splitter bottom. Stream 128 consists of liquid/vapor mixture of propane from a feed splitter bottom. Streams 126 and 128 combine to form stream 130.

Stream 130 enters cold box 100 and combines with stream 110 within cold box 100 to form stream 106.

Stream 106 combines with stream 104 after it exits cold box 100 to form stream 108.

Some of the streams flowing through cold box 100 are heated and some are cooled. Unless indicated otherwise, the following descriptions and conditions of the streams through cold box 100 are described at steady state conditions. Also, as one skilled in the art will recognize, tolerances on the process temperatures and flow rates described may vary, but generally are maintained at ±5%.

The heating source for cold box 100 is provided by a four stage propylene refrigeration system and the third stage of a three stage ethylene refrigeration system.

Stream 136 contains liquid propylene having a temperature of about 100° F. when it enters cold box 100. Stream 136 leaves cold box 100 with a temperature of about 69° F.

Stream 158 contains liquid propylene having a temperature of about 64° F. upon entering cold box 100. Stream 158 flows through cold box 100 and is cooled to a temperature of about 44° F.

Stream 176 is liquid propylene having a temperature of about 25° F. when it enters cold box 100. The exit temperature of stream 176 from cold box 100 is about −2° F.

Stream 182 contains liquid propylene with a temperature of about 0° F. when it enters cold box 100. Stream 182 flows through cold box 100 and exits cold box 100 with a temperature of about −38° F.

Stream 184 contains liquid ethylene with a temperature of about 2° F. when it flows into cold box 100. Stream 186 exits cold box 100 with a temperature of about −62° F. Stream 188 exits with a temperature of about −87° F.

Stream 134 is heated as it flows through cold box 100. The methane in stream 134 enters cold box 100 as a vapor at approximately −103° F. and exits with a temperature of about 95° F.

Stream 132 is heated as it flows through cold box 100. It enters cold box 100 as a vapor having a temperature of about −103° F. and exits cold box 100 with a temperature of about 95° F.

As stream 102 flows through cold box 100, it is heated. Stream 102 enters cold box 100 in a liquid form, at about −67° F., and exits cold box 100 in a liquid form, at about 14° F.

Stream 104 enters cold box 100 at about −45° F. and is heated as it flows through cold box 100. Stream 104 exit cold box 100 with a temperature of about 14° F.

Stream 110 is heated as it flows through cold box 100. Stream 112 has a temperature of about −27° F. and stream 116 is a mixed vapor/liquid ethane composition having a temperature of about −47° F. before combining to enter cold box 100.

Stream 130 is heated as it flows through cold box 100. Stream 126 has a temperature of about 54° F. and stream 128 has a temperature of about 55° F. prior to being combined and flowing through cold box 100.

Stream 108 has a temperature of about 89° F. and is in vapor form.

Referring to FIGS. 1A and 1B, the location and streams related to the different interlocks in a preferred embodiment will be described. In this preferred embodiment, there are five different and independent interlocks.

Interlock one 250 is located on the heated streams of cold box 100. The streams that flow through the area controlled by interlock one are streams 108, 128, 126, 124, 122, 116, 114, 120, 118, 110, 104, and 102.

Interlock two 350 is located on the fourth stage of the propylene refrigeration system. The streams that flow through the area controlled by interlock two are streams 146, 144, 148, 142, and 150.

Interlock three 450 is located on the third stage of the propylene refrigeration system. The streams that flow through the area controlled by interlock three are streams 158, 159, 160, 162, and 164.

Interlock four 550 is located on the third stage of the propylene refrigeration system. The streams that flow through the area controlled by interlock four are streams 166, 178, 168, 172, 170, 174, and 176.

Interlock five 650 is located on the fourth stage of the propylene refrigeration system. The streams that flow through the area controlled by interlock five are streams 136, 152, and 146.

Figure 2:
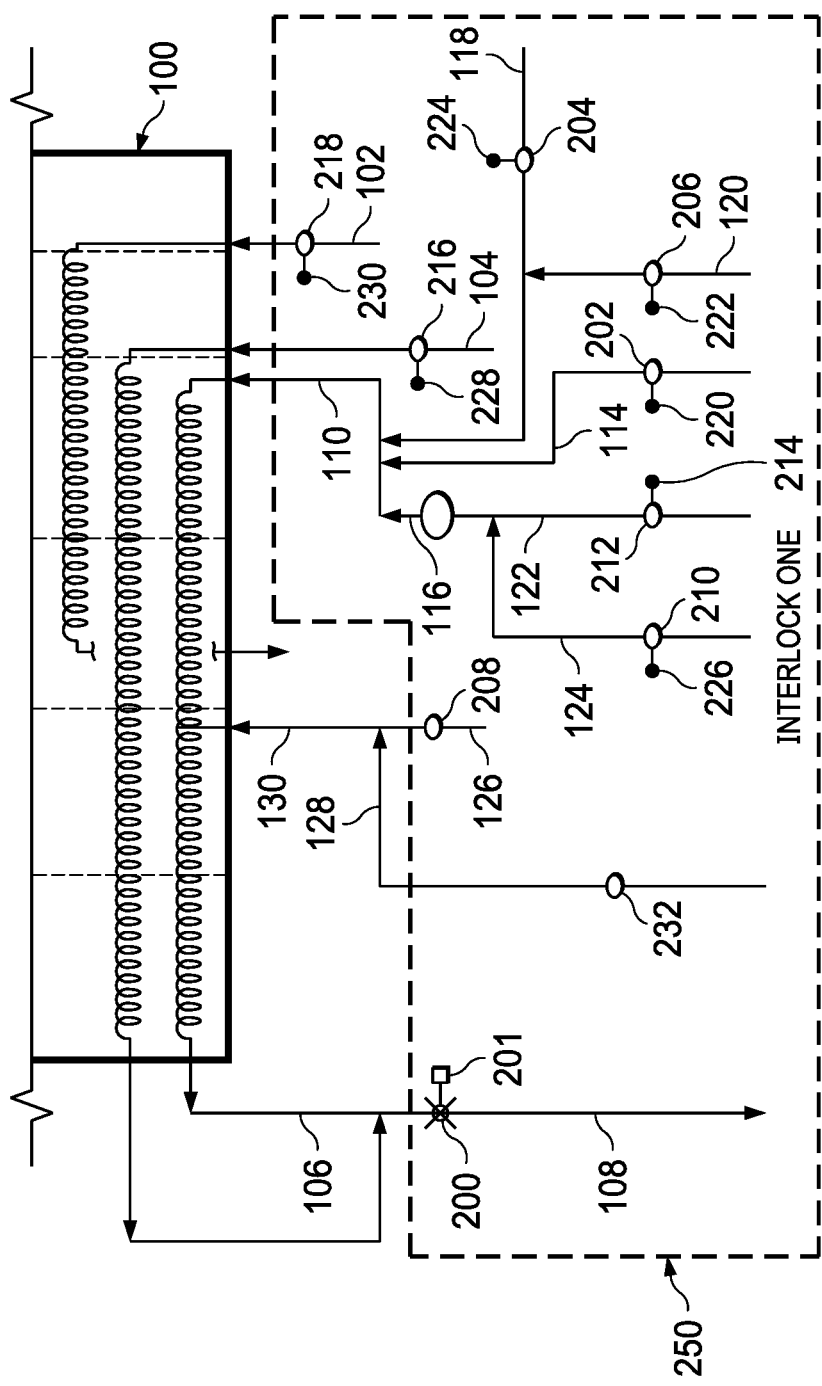
FIG. 2 is a flow sheet diagram for a preferred embodiment of an interlock.

FIG. 2 is a flow sheet diagram for a preferred embodiment of interlock one 250.

The piping for stream 108 includes temperature sensor 200 located on stream 108. Temperature sensor 200 is connected to interlock controller 201.

The piping for stream 128 includes valve 232. The piping for stream 126 includes valve 208.

The piping for stream 124 includes valve 210. Valve 210 is connected to valve controller 226.

The piping for stream 122 includes valve 212 connected to valve controller 214.

The piping for stream 114 includes valve 202 connected to valve controller 220.

The piping for stream 120 includes valve 206 connected to valve controller 222.

The piping for stream 118 includes valve 204 connected to valve controller 224.

The piping for stream 104 includes valve 216 connected to valve controller 228.

The piping for stream 102 includes pump 218 which is connected to pump controller 230.

Temperature sensor 200 determines the temperature of stream 108. Temperature sensor 200 includes three separate sensors, each of which are determining the temperature of the stream 108 independently. A greater or lesser number of sensors may be used with redundancy being preferred. Multiple sensors have the advantage of providing redundancy in the event of a failure or malfunction of one sensor. In a preferred embodiment, the temperature sensor is a Smart Sanitary Temperature type available from Smart Sensors, Inc. of Houston, Tex.

The connection between temperature sensor 200 and interlock controller 201 allows the temperature readings from temperature sensor 200 to be received by interlock controller 201.

Interlock controller 201 is connected to valve controllers 226, 214, 220, 222, 224, and 228 and pump controller 230 through a local area network. The local area network connection can be hardwired, or wireless and can carry instructions through digital or analog means. The network allows the interlock controller to send control signals to open or close the valves and control the speed of the pump. In practice, the pump can be shut down entirely and reactivated if need be by the interlock controller. The network also allows the interlock controllers, valve controllers, temperatures sensors and pump controllers to send status messages to and to receive instructions from a master controller as will be further described.

During steady state plant operating conditions, interlock controller 201 is in a "deactivated" state. Valves 210, 212, 202, 206, 204, and 216 are in the open position and pump 218 is operational and pumping material through stream 102 at the prescribed flow rate.

However, in the event that the temperature of stream 108 is determined to be at or below a selected trip temperature, as indicated by at least two of three sensors of temperature sensor 200, then interlock controller 201 enters an "activated" state and automatically sends a signal to valve controllers 226, 214, 220, 222, 224, and 228 to close valves 210, 212, 202, 206, 204, and 216 and to pump controller 230 to stop pump 281.

The valve positions and pump speed settings are shown for interlock one 250 in Table 1 below.

TABLE 1

Interlock One 250

| Valve/Pump | Deactivated State | Activated State |
|---|---|---|
| Valve 201 | Open | Closed |
| Valve 212 | Open | Closed |
| Valve 202 | Open | Closed |
| Valve 206 | Open | Closed |
| Valve 204 | Open | Closed |
| Valve 216 | Open | Closed |
| Pump 218 | On | Off |

Activation of interlock controller 201 will stop the flow of streams 112, 104, and 110 through cold box 100. Valves 232 and 208 remain open allowing stream 130 continue to flow into cold box 100. Stream 130 has a temperature of about 54° F. when it enters cold box 100 which is higher than streams 102, 104 and 110. As a result, stream 130 warms cold box 100 and increases the temperature of stream 108, thereby protecting downstream components from reaching an embrittlement temperature and preventing a shutdown of the cold box.

Typically, the selected trip temperature should be about 2° F. to about 5° F. above the embrittlement temperature of the construction material of the components to be protected. For example, a lower carbon and phosphorous content in the construction material results in lower embrittlement temperatures. As another example a lower manganese and silicon content in the construction material results in a higher embrittlement temperature. ASME B31.2 standard provides recommended safe embrittlement temperatures for various types of construction material. Carbon steel has a minimum temperature rating of −20° F. Stainless steel has a minimum temperature rating of −425° F. Hastelloy has a minimum temperature rating of −325° F. Copper and aluminum have minimum temperature ratings of −452° F.

In a preferred embodiment, the selected trip temperature for interlock one is about −18° F. In other preferred embodiments, the selected trip temperature is typically within a range of about −20° F. to about −10° F. depending on the construction of the components immediately downstream. One of skill in the art will realize that the selected trip temperature for interlock one can be the same or different than the selected trip temperature for the other interlock controllers, because the construction of the downstream components for each interlock may well be different.

Figure 3:
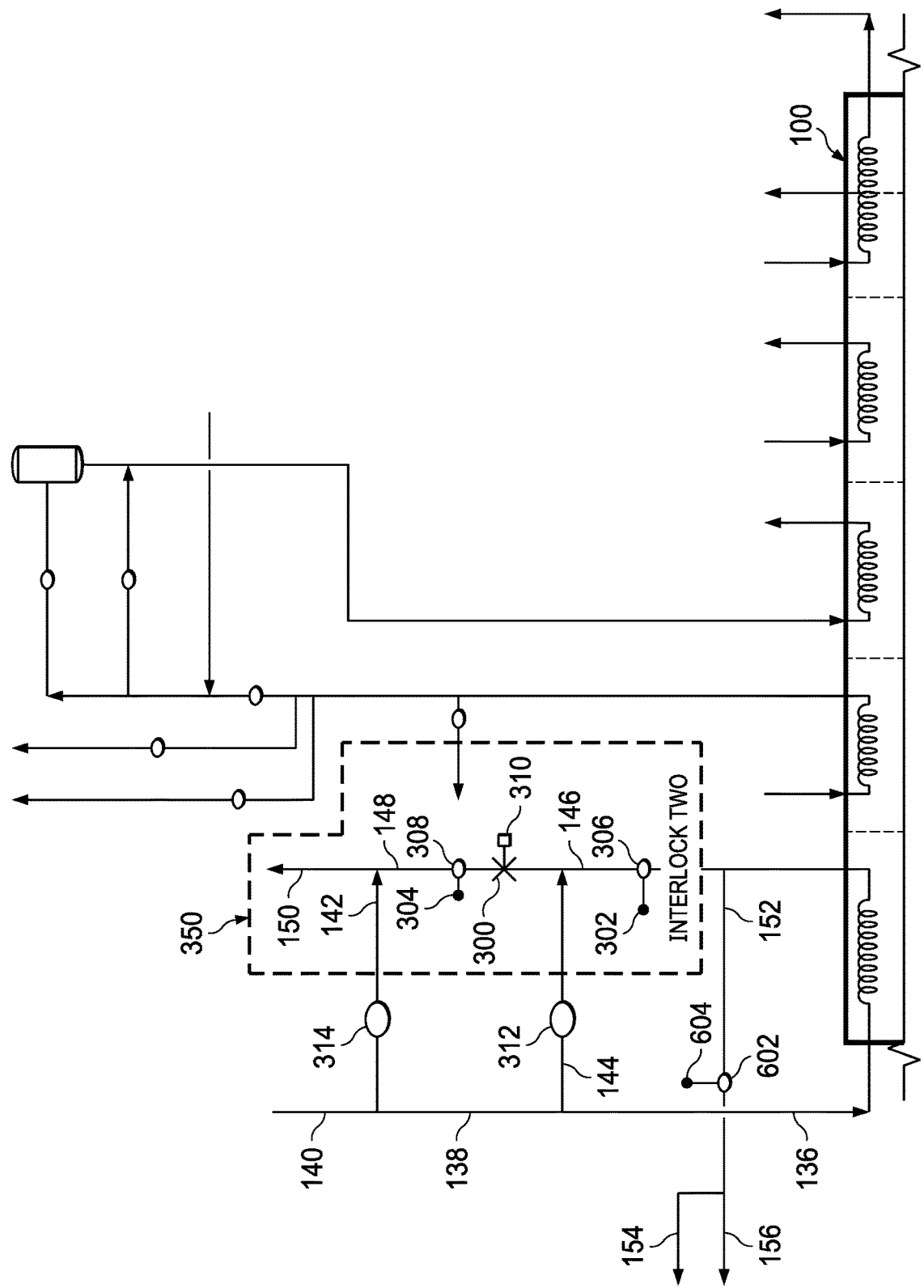
FIG. 3 is a flow sheet diagram for a preferred embodiment of an interlock.

FIG. 3 is a flow sheet diagram for interlock two 350. Interlock two 350 is designed to protect the equipment and piping downstream of stream 150.

Piping for stream 146 includes valve 306. Valve 306 is connected to valve controller 302.

Piping for stream 148 includes valve 308. Valve 308 is connected to valve controller 304.

Stream 142 flows through aluminum heat exchanger 314. Stream 144 flows through aluminum heat exchanger 312.

Piping for stream 148 includes temperature sensor 300. Temperature sensor 300 is connected to interlock controller 310. Temperature sensor 300 preferably includes three separate and redundant sensors, each of which determines the temperature of the stream 148 independently.

Interlock controller 310 is connected to valve controllers 302 and 304 through a local area network. The network allows signals to be sent from the interlock controller to the valve controllers which are able to react to the signal to either open or close the valves. The network also allows the interlock controller, the valve controllers and the temperature sensors to send status signals to and receive instructions from the master controller.

During steady state plant operations, interlock controller 310 is in a "deactivated" state and valve 306 and valve 308 are in an open position.

However, when the temperature of stream 148 is determined to be at or below a selected trip temperature by at least two of the three sensors in temperature sensor 300, then interlock controller 310 enters an "activated" state and sends a signal to valve controllers 302 and 304 to close valves 306 and 308.

The valve positions for interlock two as shown in Table 2 below.

TABLE 2

Interlock Two 350

| Valve | Deactivated State | Activated State |
|---|---|---|
| Valve 306 | Open | Closed |
| Valve 308 | Open | Closed |

Closing valves 306 and 308 allows the propylene in stream 140 to bypass cold box 100 and flow directly into stream 142, through aluminum heat exchanger 314 and into stream 150. Stream 140 passing the cold box substantially increases the temperature of stream 150 and thereby prevents complete system shut down.

In a preferred embodiment, the selected trip temperature for interlock two is about −18° F. In other preferred embodiments, the selected trip temperature is within a range of about −20° F. to about −10° F. The selected trip temperature may be the same or different from the selected trip temperatures of other interlock controllers.

Figure 4:
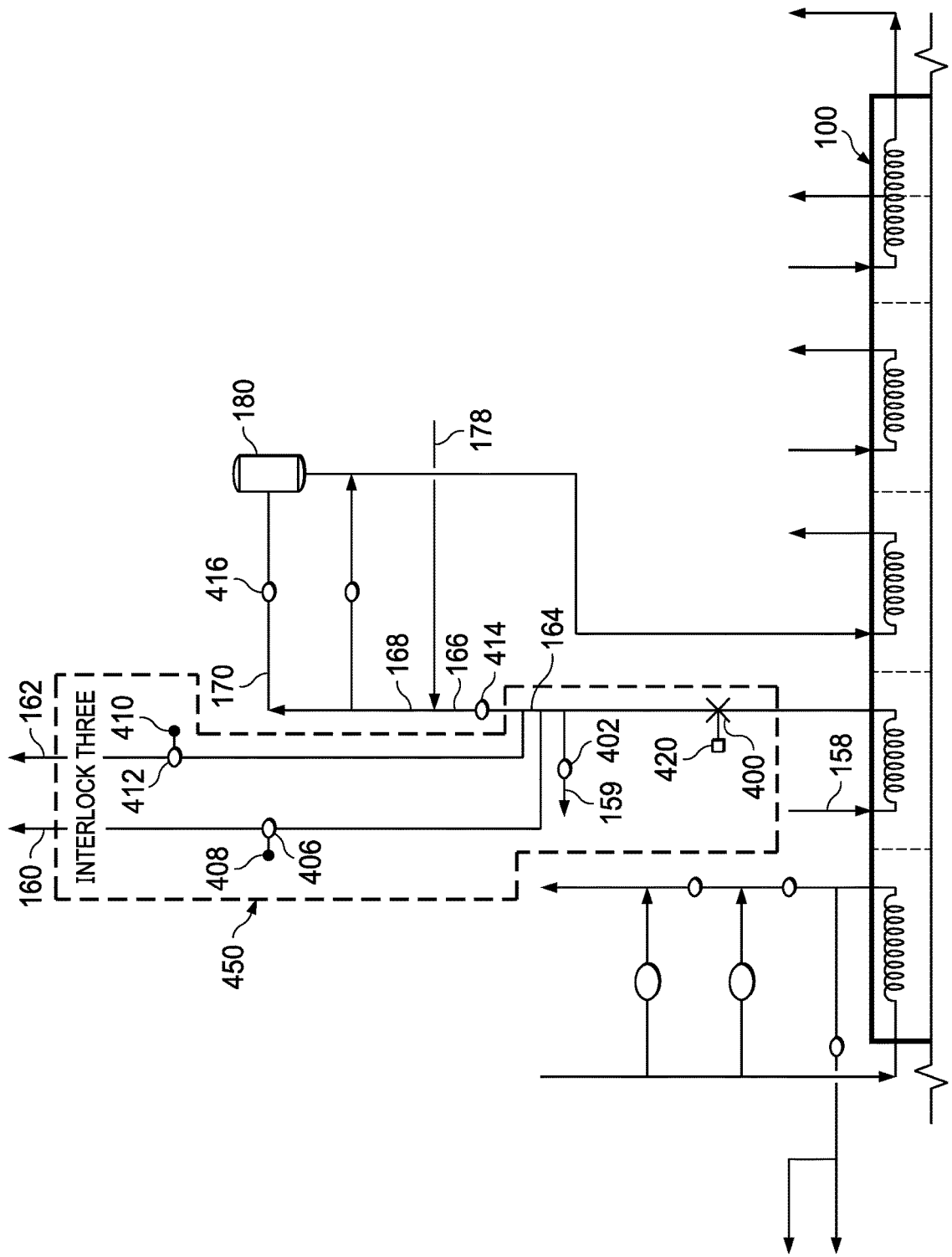
FIG. 4 is a flow sheet diagram for a preferred embodiment of an interlock.

FIG. 4 is a flow sheet diagram for interlock three 450 on the propylene refrigeration system which, in this embodiment, cools the propylene in cold box 100.

Piping for stream 159 includes liquid drain valve 402.

Piping for stream 160 includes valve 406 which is connected to valve controller 408. Piping for stream 162 includes valve 412 which is connected to valve controller 410.

Piping for stream 158 includes temperature sensor 400. Temperature sensor 400 reads the temperature of the propylene in stream 158 after it exits cold box 100. Temperature sensor 400 preferably includes three separate and redundant sensors, each of which independently determines the temperature of stream 158.

Temperature sensor 400 is connected to interlock controller 420.

Interlock controller 420 is connected to valve controllers 408 and 410. The connection between interlock controller 420 and valve controllers 408 and 410 is through a local area network. The network connections can be hardwired or wireless. The network allows for signals to be sent from interlock controller 420 to valve controllers 408 and 410 which react to the signal by either opening or closing the valves. The network also allows the interlock controller, the valve controllers and the temperature sensors to send status signals to and receive instructions from the master controller.

During steady state operating conditions, interlock three 420 is in a "deactivated" state and valve 406 and valve 412 are in an open position.

In the event that temperature sensor 400 reports a temperature at or below a selected trip temperature, by at least two of the three sensors, interlock controller 420 enters an "activated" state and sends a signal to valve controllers 408 and 410 to close valves 406 and 412. Closing valves 406 and 412 prevents the cold propylene liquid from reaching the aluminum heat exchangers located downstream. Table 3 below shows the valve positions for interlock three 450.

TABLE 3

| | Interlock Three 450 | |
|---|---|---|
| Valve | Deactivated State | Activated State |
| Valve 406 | Open | Closed |
| Valve 412 | Open | Closed |

In a preferred embodiment, the selected trip temperature is about −18° F. In other preferred embodiments, the selected trip temperature can be within a range of about −23° F. to about −13° F. The selected trip temperature for interlock controller 420 can be the same or different from other selected trip temperatures for other interlock controllers, depending on the construction material of the downstream components.

Piping for stream 166 includes valve 414. When interlock 420 is activated, valves 406 and 412 are closed, but valve 414 remains open. As a result, stream 166 joins warmer propylene from stream 178. The addition of warmer propylene from stream 178 increases the temperature of the propylene in stream 168. Stream 168 is allowed to continue to tank 180 and further on through the system thereby preventing system shut down.

Figure 5:
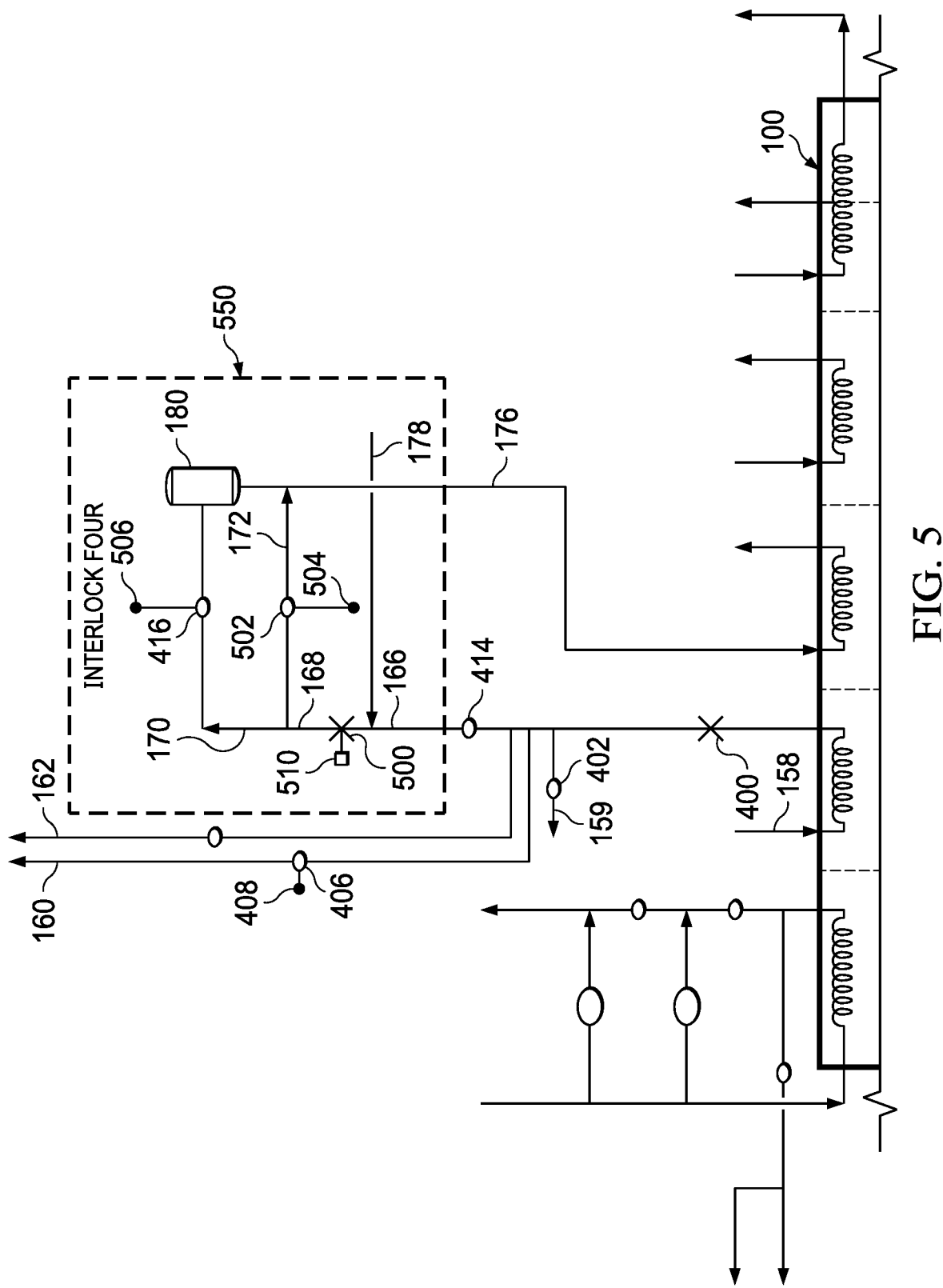
FIG. 5 is a flow sheet diagram for a preferred embodiment of an interlock.

FIG. 5 is a flow sheet diagram for interlock four 550 on the third stage of a propylene refrigeration system that cools the propylene flowing through cold box 100. Interlock four 550 is designed to protect tank 180 from receiving liquid propylene at a temperature below a selected trip temperature.

Piping for stream 170 includes valve 416. Valve 416 is connected to valve controller 506. The piping for stream 172 includes valve 502 which is connected to valve controller 504 and is typically constructed of stainless-steel material.

Piping for stream 168 includes temperature sensor 500. Temperature sensor 500 determines the temperature of stream 168. Temperature sensor 500 preferably includes three separate and redundant sensors, each of which determines the temperature of stream 168 independently. Temperature sensor 500 is connected to interlock controller 510. The connection allows the temperature readings from temperature sensor 500 to be sent to interlock controller 510.

Interlock controller 510 is connected to valve controllers 504 and 506 by a local area network. The network allows signals to be sent from interlock controller 510 to valve controllers 504 and 506 which can react by either opening or closing the valves. The network connection also shows the interlock controller, the valve controllers and the temperature sensors to send status messages to and receive instructions from the master controller.

During steady state conditions, interlock four is in a "deactivated" state, valve 416 is in the open position and valve 502 is in the closed position. Table 4 below shows the valve positions for interlock four 550.

TABLE 4

| | Interlock Four 550 | |
|---|---|---|
| Valve | Deactivated State | Activated State |
| Valve 416 | Open | Closed |
| Valve 502 | Closed | Open |

If the temperature of stream 168 is determined to be at or below a selected trip temperature by at least two of the three sensors in temperature sensor 500, then interlock controller 510 enters an "activated" state and sends a signal to valve controller 506 to close valve 416 and to valve controller 504 to open valve 502. A temperature reading at or below the selected trip temperature for interlock controller 510 by temperature sensor 500 is most likely to occur when the addition of warmer propylene from stream 178 is insufficient to raise the temperature of the propylene above the selected trip temperature. When this occurs, the propylene bypasses tank 180 and continues through to stream 176. The bypass of tank 180 allows the propylene to continue to flow through the process while preventing exposure of tank 180 to temperatures at or below the selected temperature.

In a preferred embodiment, the selected trip temperature is about −18° F. In other preferred embodiments, the selected trip temperature could be within a range of approximately −20° F. to approximately −10° F. depending on the construction material of downstream components. The trip temperature for interlock controller 510 may be the same or different than the trip temperature for other interlock controllers.

Figure 6:
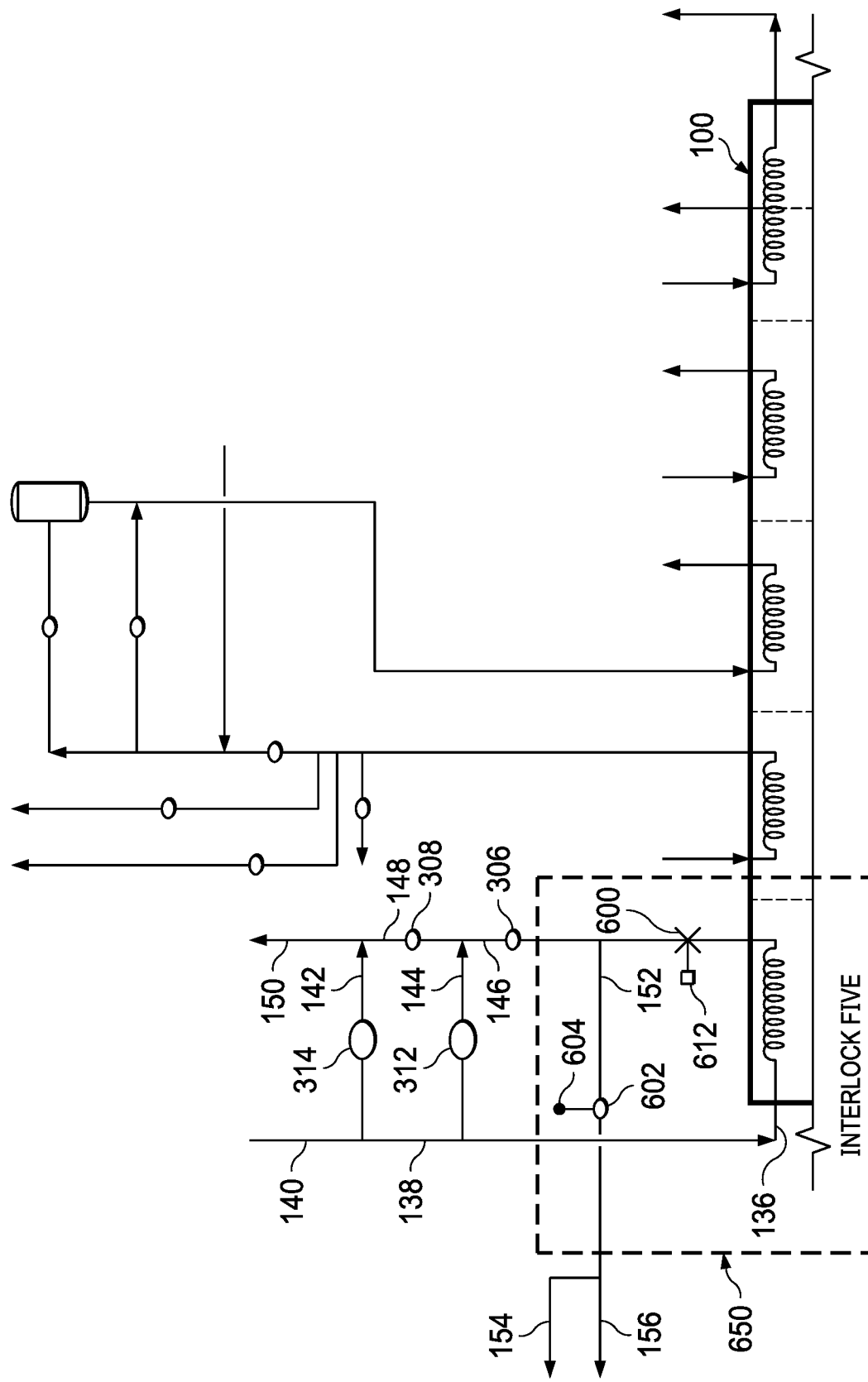
FIG. 6 is a flow sheet diagram for a preferred embodiment of an interlock.

FIG. 6 is a flow sheet diagram for interlock five 650 on the fourth stage of the propylene refrigeration system.

Piping for stream 152 includes valve 602. Valve 602 is connected to valve controller 604.

Piping for stream 136 includes temperature sensor 600. Temperature sensor 600 determines the temperature of the propylene in stream 136 after it exits cold box 100. Temperature sensor 600 preferably includes three separate and redundant sensors, each of which determines the temperature of stream 136 independently. Temperature sensor 600 is connected to interlock controller 612. The connection allows the temperature readings from temperature sensor 600 to be sent to interlock controller 612.

Interlock controller 612 is connected to valve controller 604 through a local area network. The network allows signals to be sent from interlock controller 612 to valve controller 604 which reacts to the signal by either opening or closing the valves. The network also allows the interlock controller, the valve controller and the temperature sensor to send status messages to and receive instructions from the master controller.

During steady state operation, interlock five is in a "deactivated" state and valve 604 is open.

When the temperature of stream 136 is determined to be at or below a selected trip temperature by at least two of the three sensors in temperature sensor 600, interlock controller 612 enters an "activated" state and sends a signal to valve controller 604 to close valve 602. Table 5 below shows the valve positions for interlock five.

TABLE 5

| Interlock Five 650 | | |
|---|---|---|
| Valve | Deactivated State | Activated State |
| Valve 602 | Open | Closed |

The closure of valve 602 prevents the flow of liquid propylene with a temperature at or below the selected trip temperature from reaching heat exchangers and piping connected to streams 156 and 154. Further, piping for stream 146 includes valve 306. Valve 306 remains open and allows the propylene in stream 136 to mix with warmer propylene in streams 144 and 142 before proceeding through the system. The mixture of the warmer propylene allows it to continue to flow through the system which avoids a complete system shut down.

Interlock 650 often works in conjunction with the interlock 350. However, interlock 650 is independent of the activation of interlock 350. Specifically, if interlock 650 is activated and the warmer propylene from stream 144 is insufficient to raise the temperature in stream 148 above the selected trip temperature for interlock controller 310, then interlock controller 310 is also be activated.

In a preferred embodiment, the selected trip temperature for interlock five is about −18° F. In other preferred embodiments, the selected trip temperature could be within a range of about −20° F. to about −10° F. The trip temperature for this interlock controller can be the same or different than that of other interlock controllers.

In the preferred embodiment, all of disclosed interlocks have the same selected trip temperature of about −18° F. However, the selected trip temperature may be different than −18° F. and may be different for each interlock controller.

Figure 7:
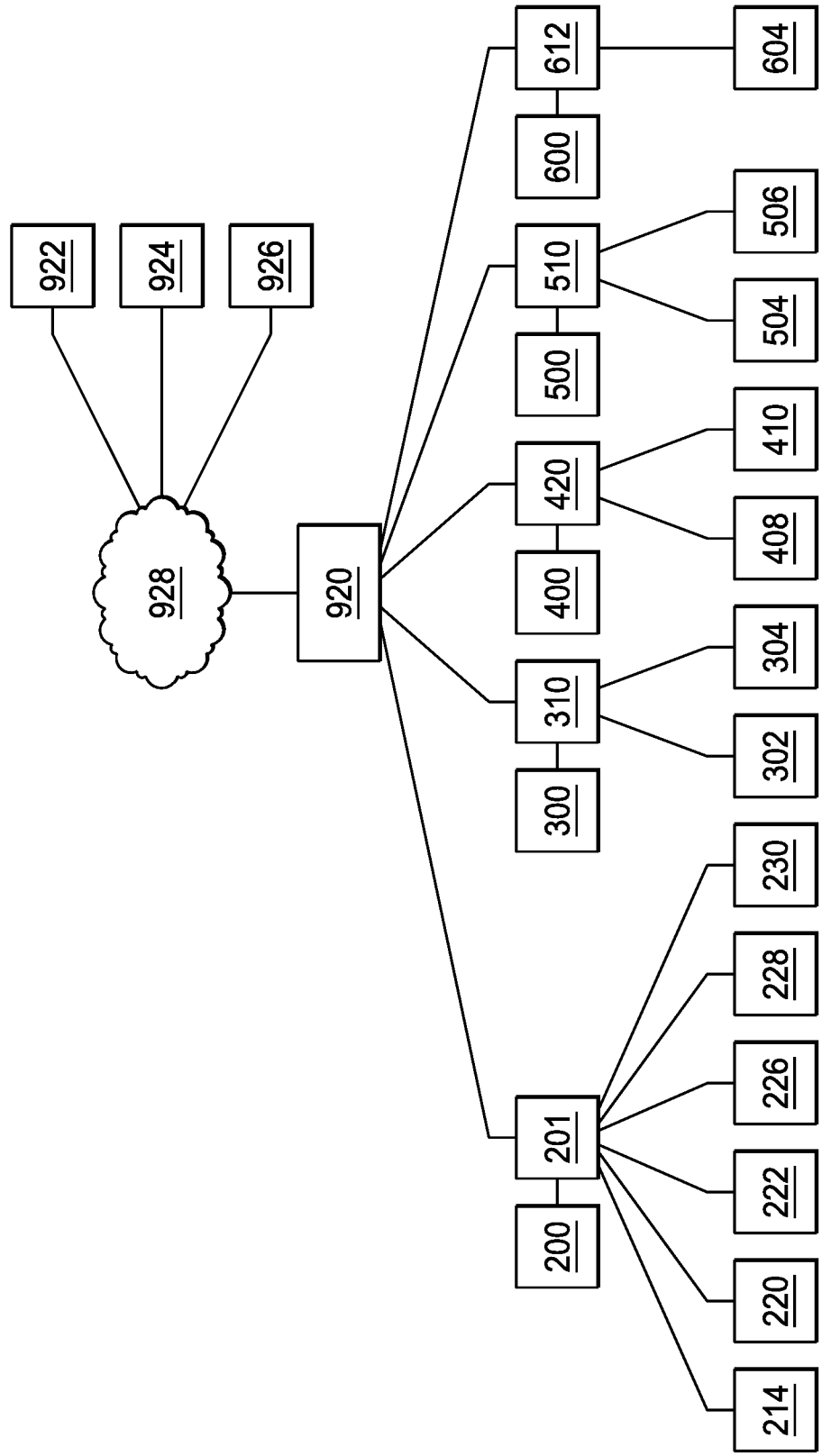
FIG. 7 is a computer architecture drawing showing the arrangement of certain interlock controllers and processors.

FIG. 7 is an architecture diagram of a preferred embodiment of a computer network used to monitor the interlocks. Master controller 920 is connected through wide area network 928 to remote monitoring processors 922, 924, and 926. Master controller 920 is also connected directly to interlock controllers 201, 310, 420, 510, and 612, to valve controllers 214, 220, 222, 226, 228, 302, 304, 408, 410, 504, 506, 604 and 608 pump controller 230 and to temperature sensors 200, 300, 400, 500 and 600.

Interlock controller 201 is connected to temperature sensor 200. Interlock controller 201 is further connected to valve controllers 214, 220, 222, 226, and 228 and pump controller 230.

Interlock controller 310 is connected to temperature sensor 200 and valve controllers 302 and 304.

Interlock controller 420 is connected to temperature sensor 400 and valve controllers 408 and 410.

Interlock controller 510 is connected to temperature sensor 500 and valve controllers 504 and 506.

Interlock controller 612 is connected to temperature sensor 600 and valve controller 604.

In practice, master controller 920 allows for monitoring and override of the activation and deactivation of the interlocks and notification of the operators that a system malfunction has occurred or has been rectified. Master controller 920 can display the activation status of each interlock controller, each valve controller, pump controller and each temperature sensor. The master controller also logs and stores all temperatures, valve positions, pump conditions and flow rates and interlock status in a database for later analysis and for predictive correction of potentially hazardous equipment failures.

Remote processors 922, 924, and 926 can include dedicated processors and controllers and can also include processors such as cell phones and work stations.

Figure 8:
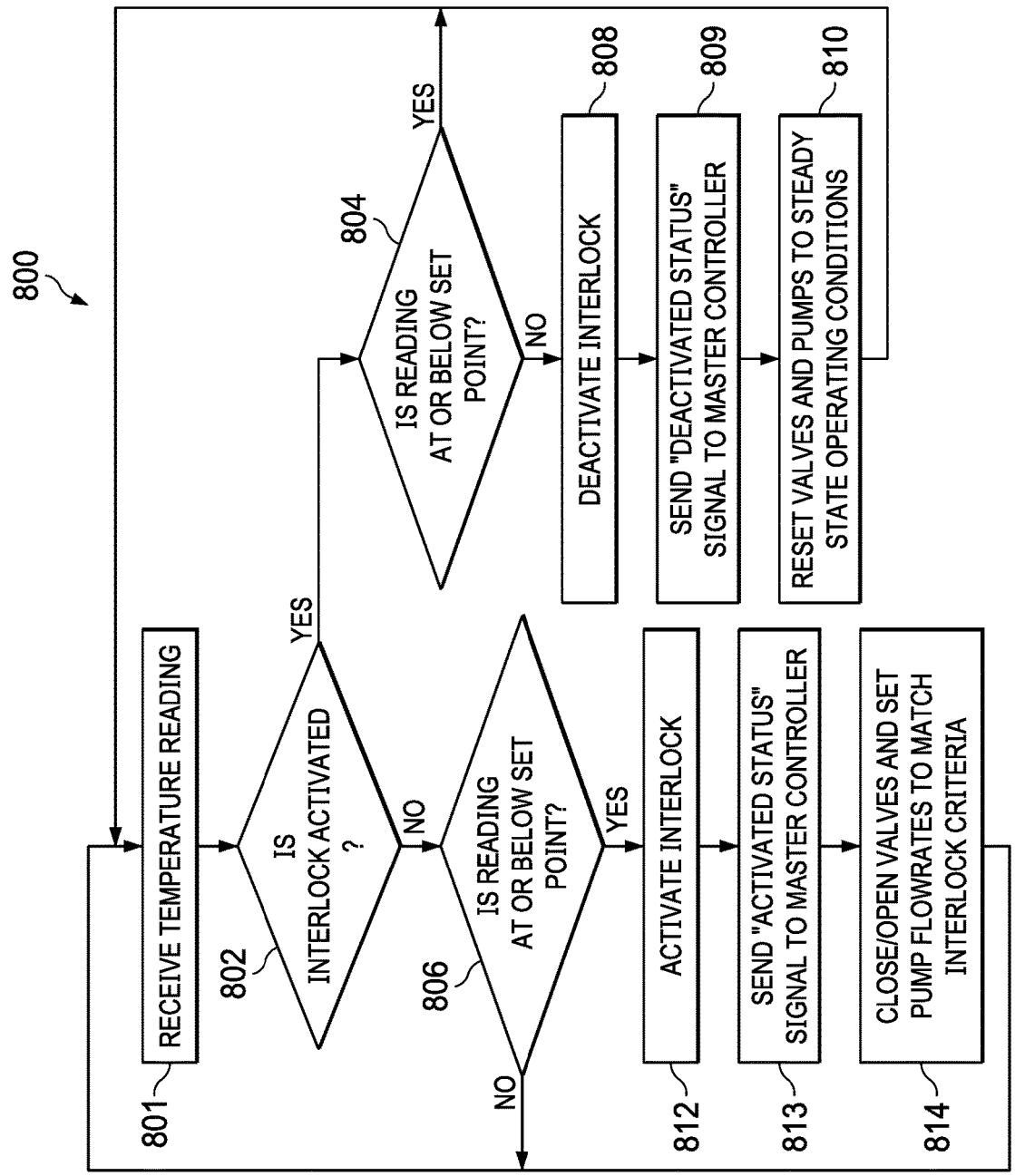
FIG. 8 is a flow chart for the operation of a preferred embodiment of an interlock controller in response to a temperature reading.

FIG. 8 is a flow chart of a preferred embodiment of method 800 that each of the interlock controllers employs during operation. At step 801, the interlock controller receives a temperature reading from a temperature sensor. At step 802, the interlock controller determines if it is in an activated state or not. If in an "activated" state, then the method moves to step 804. At step 804, the interlock controller compares the temperature reading received to the pre-selected trip temperature. If the temperature reading is at or below the trip temperature, then the interlock controller returns to step 801. At step 804, if the temperature reading is above the trip temperature, then the interlock controller moves to a "deactivated" state at step 808. At step 809, the interlock controller sends a "deactivated" status signal to the master controller. In step 810, the interlock controller resets the valves and pumps to steady state operating conditions according to a predetermined table. The interlock controller then returns to step 801 to wait for another temperature reading.

If at step 802 the interlock controller is not activated, then it moves to step 806. At step 806, the interlock controller compares the temperature reading received with the pre-selected trip temperature. If the temperature reading is not at or below the trip temperature, then the interlock controller takes no action and returns to step 801 to await another temperature reading. If at step 806 the temperature reading is at or below the trip temperature, then the interlock controller moves to step 812. At step 812, the interlock controller enters an "activated" state. At step 813, the interlock controller sends an "activated" status signal to the master controller. At step 814, the interlock controller opens and/or closes valves and sets pump speeds according to a prescribed table. The interlock controller then returns to step 801 to wait for another temperature reading.

Figure 9:
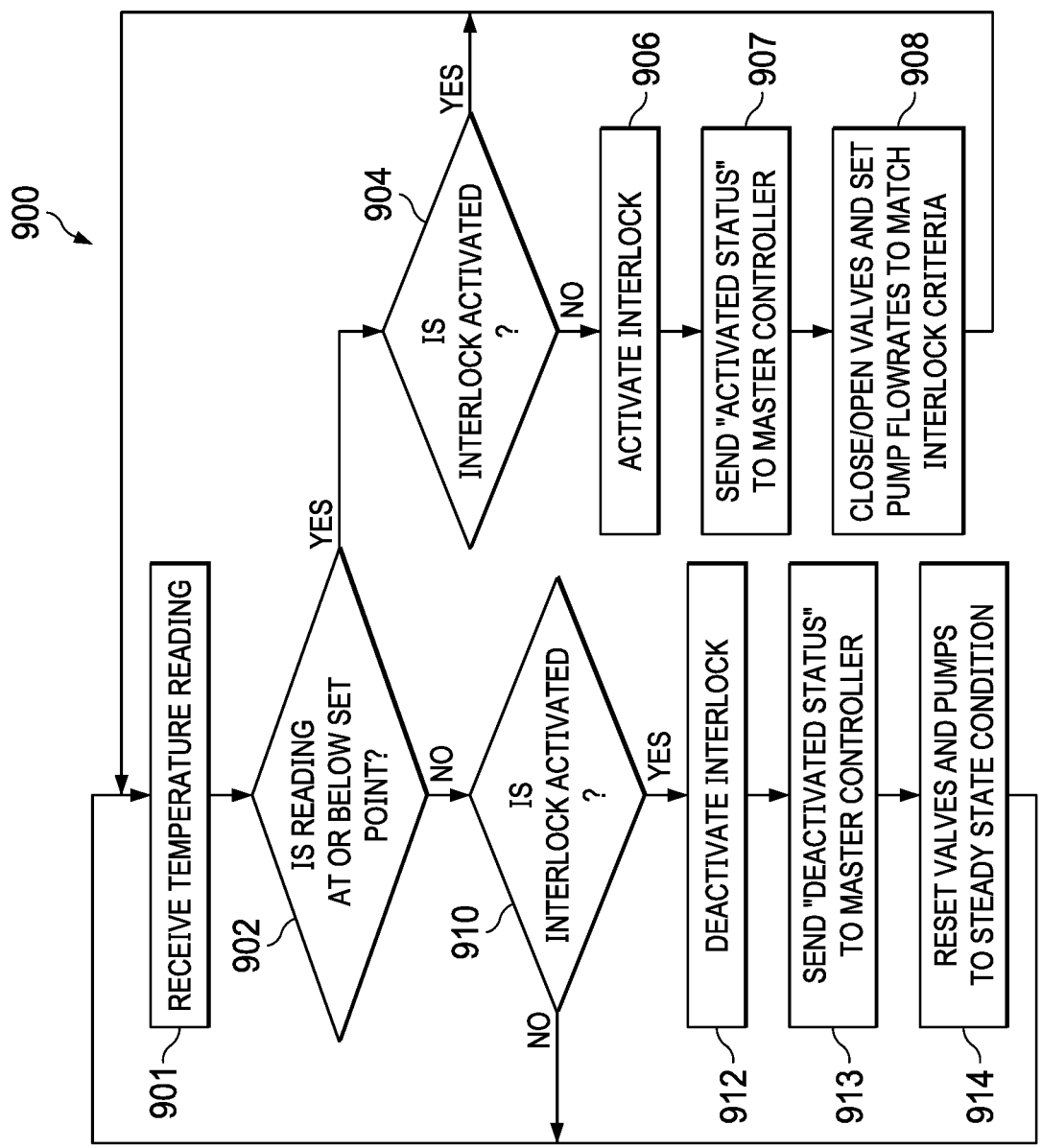
FIG. 9 is a flow chart for the operation of a preferred embodiment of an interlock controller in response to a temperature reading.

FIG. 9 is a flow chart of another preferred embodiment of method 900 that each of the interlock controllers employs during operation. At step 901, the interlock controller receives a temperature reading from a temperature sensor. At step 902, the interlock controller compares the temperature reading received to a pre-selected trip temperature. If the temperature reading is at or below the trip temperature, then the interlock controller moves to step 904. At step 904, the interlock controller determines whether or not it is in an "activated" state. If the interlock controller is in a activated state, then it returns to step 901 to await another temperature reading. If the interlock is not in an activated state then the method moves to step 906. At step 906, the interlock controller enters an activated state. At step 907, the interlock controller sends an activated status signal to the master controller. At step 908, the interlock controller opens and/or closes valves and sets pumps speeds according to a prescribed table. The interlock controller then returns to step 901 to await another temperature reading.

Returning to step 902, if the temperature reading is not at or below the trip temperature then the method moves to step 910. At step 910, the interlock controller determines whether or not it is in activated state. If the interlock controller is not in an activated state then the method returns to step 901. If the interlock controller is in an activated state, the method moves to step 912. At step 912, the interlock controller enters a deactivated state. At step 913, the interlock controller sends a deactivated status message to the master controller. At step 914, the interlock controller resets the valves and pumps to steady state operating conditions according to a prescribed table. The interlock controller then returns to step 901 to await another temperature reading.

Figure 10A:
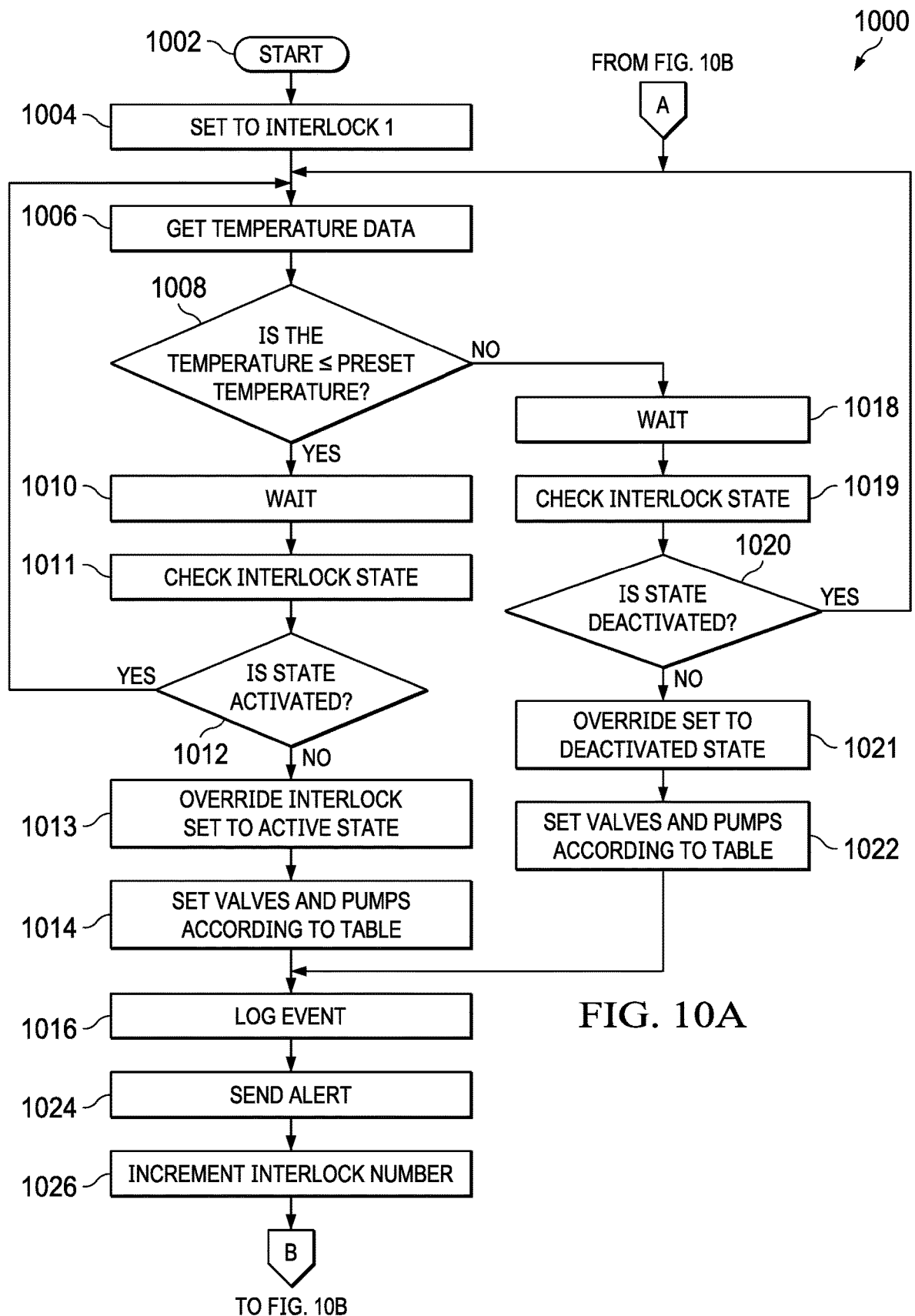
FIGS. 10A and 10B is a flow chart for an interlock override method of a preferred embodiment.
Figure 10B:
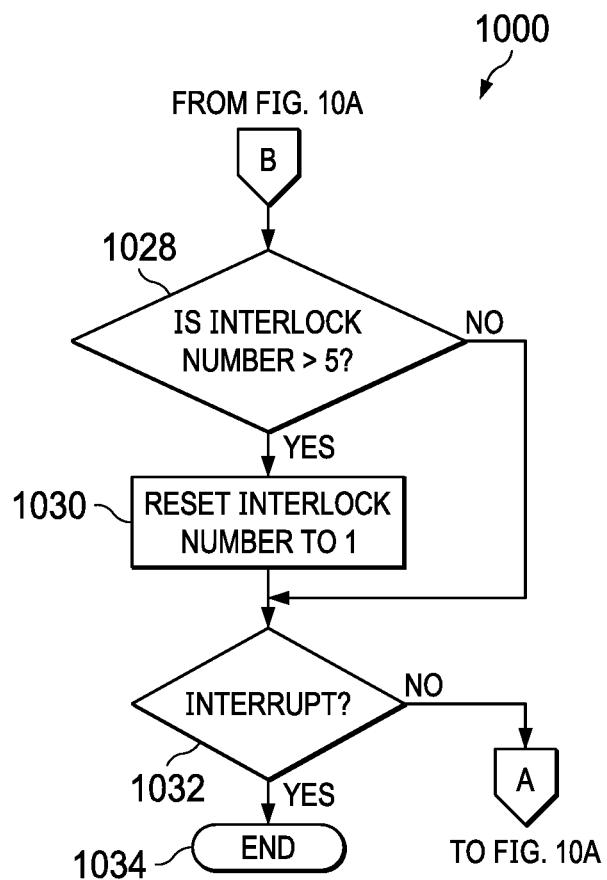

Referring to FIGS. 10A and 10B, a preferred method of interlock override will be described. Method 1000 is carried out by a computer program resident in master controller 920. In a preferred embodiment, the method in coded in C++ and is executed on a suitable processor.

At step 1002, the method starts. At step 1004, master controller sets the default interlock to interlock one. At step 1006, the master controller polls the temperature sensor connected to the default interlock. At step 1008, the master processor compares the temperature to the pre-selected trip temperature for the default interlock. If the temperature retrieved is less than the pre-selected trip temperature, then the master controller moves to step 1010. At step 1010, master processor waits a predefined period of time sufficient for the default interlock to enter an active state. In a preferred embodiment, the master controller waits about fifteen (15) minutes at step 1010. After this period of time, it is presumed that the default interlock controller should have acted independently. However, one skilled in the art will recognize that this time period can vary significantly based on the interlock being activated and the composition (s) of the streams and equipment being monitored. At step 1011, the master controller polls the default interlock controller to determine its state. At step 1012, if the state of the default interlock is "activated" then the master processor returns to step 1006. At step 1012, if the state of the interlock is "deactivated" then the processor proceeds to step 1013. At step 1013, the master controller overrides the interlock and sets it to an activated state. At step 1014, the master controller manually sets the valves and pumps according to the activated state table prescribed for the default interlock. At step 1016, the master controller logs the event in a database according to the date, time and default interlock number.

Returning to step 1008, if the received temperature is greater than the pre-selected trip temperature, then the method moves to step 1018. At step 1018, the master controller waits a certain prescribed period of time, as previously described. At step 1019, the master controller checks the default interlock to determine its state. At step 1020, if the state of the default interlock controller is "deactivated" then the method returns to step 1006. At step 1020, if the state of the default interlock controller is not deactivated, then the master controller moves to step 1021 and overrides the state of the default interlock controller and manually sets it to a deactivated state. At step 1022, the master controller then manually sets the valves and pumps to the according to the deactivated state table for the default interlock. The method then moves to step 1016, where the event is logged for later analysis.

At step 1024, the master controller sends an alert through the wide area network to at least one of processors 922, 924 and 926, as previously described. The method then moves to step 1026. At step 1026, the master controller increments the default interlock number. At step 1028 the method compares the default interlock number to the maximum number of interlocks in the system. If the default interlock number is greater than the maximum number of interlocks in the system, then at step 1030 the master processor resets the default interlock number to 1 and moves to step 1032. At step 1028, if the default interlock number is less than the maximum number of interlocks in the system, then the method moves to step 1032. At step 1032, the master controller checks for an interrupt from any of processors 922, 924, 926 if no interrupt is present, then the method returns to step 1006. If an interrupt is present, the method moves to step 1034 and ends.

In a preferred embodiment, the interlock failure data is stored in a table having an entry for each interlock for each preselected time period. In a preferred embodiment, each interlock controller is polled by the master controller for failure status each 15 minutes and status bits are taken at that time. The time period can vary based on the proximity of the process temperature to the embrittlement temperature of the most sensitive components in the interlocks. In a preferred embodiment, the maximum time period should be the shortest time it takes for any component to reach an embrittlement temperature from the steady state process temperature for that component. Other shorter time periods may be selected depending on the granularity of the failure data desired. An example of an interlock failure status table for each interlock $I_1$ through $I_5$ for time periods $t_0$ through $t_z$ is shown below in Table 6.

TABLE 6

| Time | $I_1$ | $I_2$ | $I_3$ | $I_4$ | $I_5$ |
|---|---|---|---|---|---|
| $t_0$ | $x_{1,t0}$ | $x_{2,t0}$ | $x_{3,t0}$ | $x_{4,t0}$ | $x_{5,t0}$ |
| $t_1$ | $x_{1,t1}$ | $x_{2,t1}$ | $x_{3,t1}$ | $x_{4,t1}$ | $x_{5,t1}$ |
| $t_2$ | $x_{1,t2}$ | $x_{2,t2}$ | $x_{3,t2}$ | $x_{4,t2}$ | $x_{5,t2}$ |
| $t_3$ | $x_{1,t3}$ | $x_{2,t3}$ | $x_{3,t3}$ | $x_{4,t3}$ | $x_{5,t3}$ |
| . | . | . | . | . | . |
| . | . | . | . | . | . |
| . | . | . | . | . | . |
| $t_z$ | $x_{1,tz}$ | $x_{2,tz}$ | $x_{3,tz}$ | $x_{4,tz}$ | $x_{5,tz}$ |

In the interlock failure table, an interlock failure "x" is recorded as a digital "1" if an interlock is a "failure" mode at the time "t". A digital "0" is recorded for each interlock that is not in failure mode at the time "t" data is taken. The master processor continuously adds rows to the interlock failure table each polling of the interlock controller, for each successive time period "t" while the cold box system is active.

In a preferred embodiment, failure of any interlock controller can be predicted by an artificial neural network learning algorithm. In general, an artificial neural network includes an input layer that receives data, a hidden layer which process the data, and an output layer which displays the results. The network must be "trained" using a set of training input having a known set of training outputs. Once trained, the artificial neural network can recognize an unknown pattern and produce a result. In this case, the result is the recognition of a future failure states for any given interlocks given the past failure states of all the interlocks.

Figure 11:
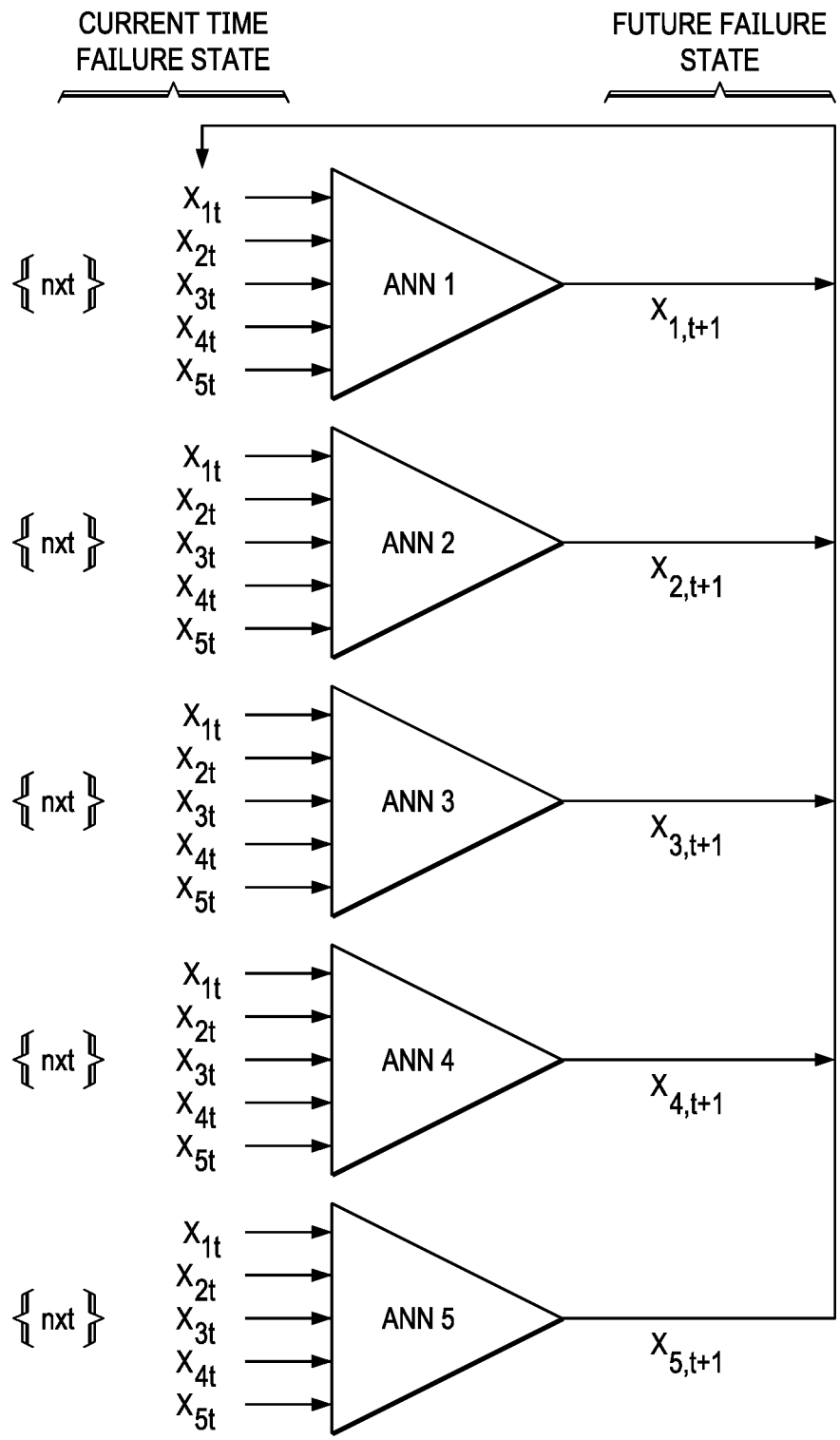
FIG. 11 is a schematic diagram of an artificial neural network of a preferred embodiment.

As shown in FIG. 11, in a preferred embodiment, the master controller maintains a separate artificial neural network for each interlock $ANN_1$, $ANN_2$, $ANN_3$, $ANN_4$ and $ANN_5$. In a preferred embodiment, each of these neural networks is the same, and will be further described. The input for each artificial neural network is the failure state of each interlock, $x_1$, $x_2$, $x_3$, $x_4$, and $x_5$ at time (t), as shown. Each artificial neural network then predicts the failure state of a single interlock, "n" at time t+1 provided the input of the failure state for all of the interlocks at time period (t). The output of each artificial neural network can then be used as feedback into the input, thereby projecting the failure state of each interlock one time period further into the future. For example, from times t+2 through t+z. Feedback of the failure states into the input can be repeated in order to project the failure states of each interlock further into the future.

Figure 12:
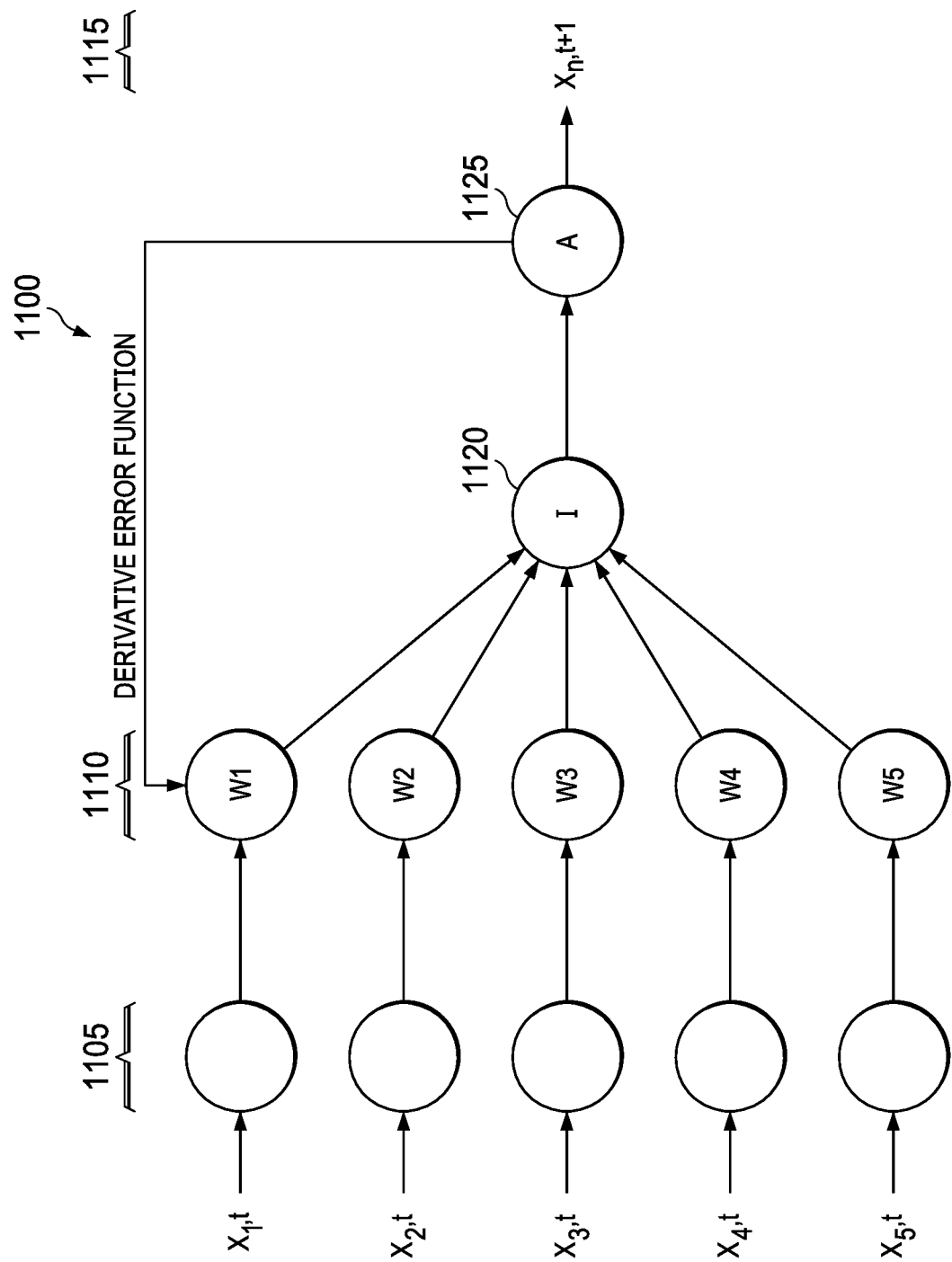
FIG. 12 is a schematic diagram of the neuron arrangement of an artificial neural network of a preferred embodiment.

A preferred embodiment of a single artificial neural network for predicting the failure state of any single interlock is shown in FIG. 12. Neural network 1100 includes input layer 1105, weighting layer 1110 and output layer 1115. The inputs are weighted are processed through an input function 1120 and activation function 1125 before reaching an output value. Backpropagation is provided by the activation function applied to the weighed neurons. In a preferred embodiment, input function 1120 is a weighted sum of the inputs. In a preferred embodiment, activation function 1125 is the sigmoid function, as will be further described. One of skill in the art will recognize that other arrangements, numbers and layers of neurons are possible that may provide the desired predictive features of the invention.

The sigmoid function is preferred for the activation function because its output can conveniently be used to generate its derivative. For example, if the output variable is "x" then its derivative will be x*(1-x). The sigmoid function is shown below.

$$S(x) = \frac{1}{1+e^{-x}} = \frac{e^x}{e^x+1} \qquad \text{Eq. 1}$$

In a preferred embodiment, output layer 1115 assumes the value, either "0" or "1". The output value $x_{n,t+1}$ is the predicted failure state, "x" for interlock "n" at time "t+1". In this embodiment, an output value of "1" is a predicted "failure" state. An output of "0" is a prediction of a "no failure" state. In this way, the failure state of any given interlock can be predicted into the future to assist in preventative maintenance scheduling.

Training for each artificial neural network requires a training input and training output. The training input for each neural network is provided by the interlock failure table of FIG. 6. The training input for each artificial neural network "n" for time $t_0$ through $t_z$ is shown below in Table 7.

TABLE 7

| Time | $I_1$ | $I_2$ | $I_3$ | $I_4$ | $I_5$ |
| --- | --- | --- | --- | --- | --- |
| $t_0$ | $x_{1,t1}$ | $x_{2,t1}$ | $x_{3,t1}$ | $x_{4,t1}$ | $x_{5,t1}$ |
| $t_1$ | $x_{1,t2}$ | $x_{2,t2}$ | $x_{3,t2}$ | $x_{4,t2}$ | $x_{5,t2}$ |
| $t_2$ | $x_{1,t3}$ | $x_{2,t3}$ | $x_{3,t3}$ | $x_{4,t3}$ | $x_{5,t3}$ |
| $t_3$ | $x_{1,t4}$ | $x_{2,t4}$ | $x_{3,t4}$ | $x_{4,t4}$ | $x_{5,t4}$ |
| . | . | . | . | . | . |
| . | . | . | . | . | . |
| . | . | . | . | . | . |
| $t_z$ | $x_{1,z+1}$ | $x_{2,z+2}$ | $x_{3,z+3}$ | $x_{4,z+4}$ | $x_{5,z+5}$ |

As can be seen from Table 7, the training output for each of the artificial neural networks is separate and assumes a value $x_{n,\,t+1}$. For example, at time to the training output for the interlock one ANN will be $x_1$, $t_1$, the failure state "x" for interlock one at time "$t_0$". In the same way, the training output for interlock two at time "$t_0$" will be "$x_{2,t1}$". The training output for interlock three will be "$x_{3,\,t1}$" at time "$t_0$", and so on. For each time period $t_1$ through $t_z$ the training output is the value of the failure state one time period ahead of the training input failure states.

Figure 13:
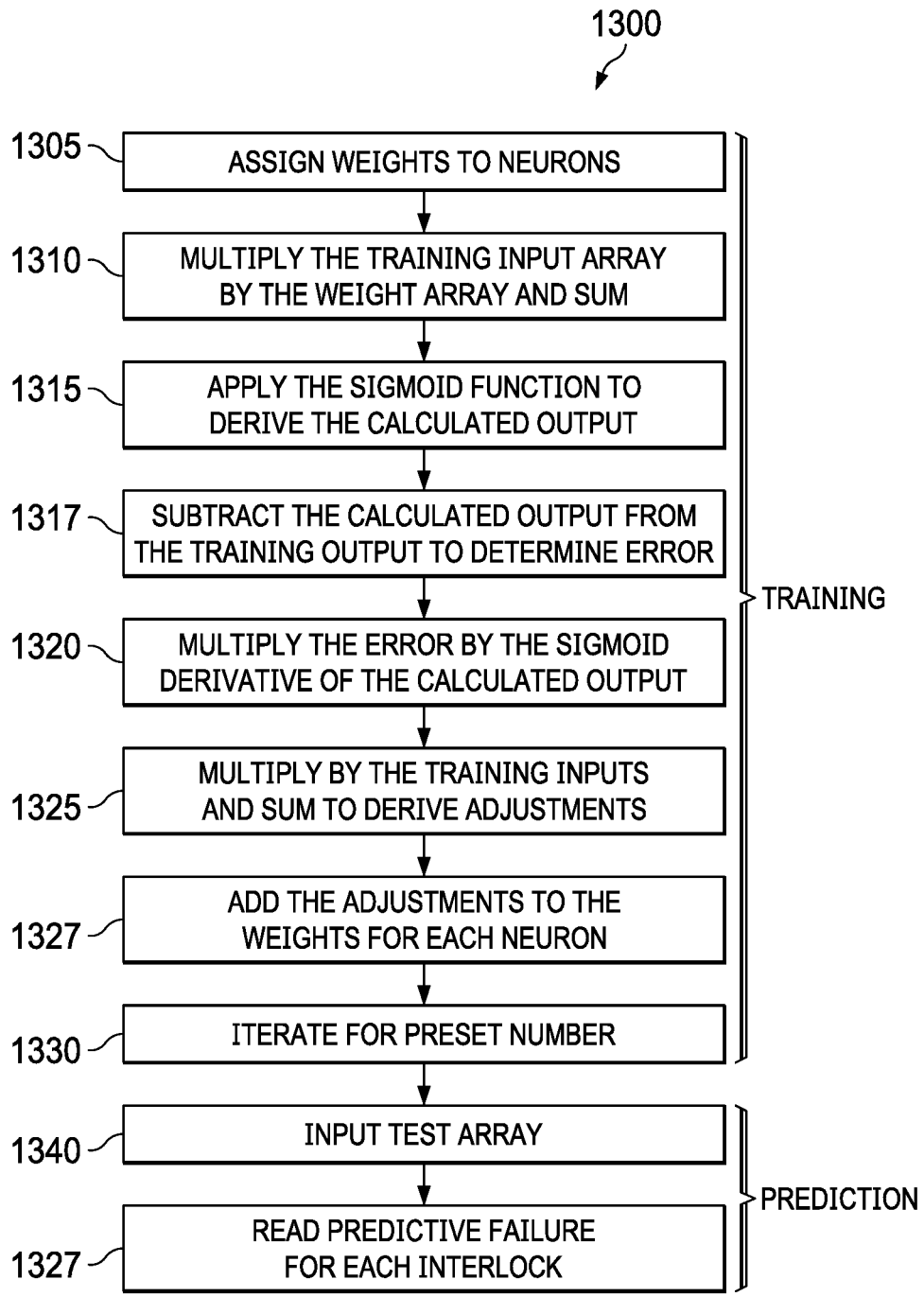
FIG. 13 is a flow chart of the training and activation of an artificial neural network of a preferred embodiment.

Referring to FIG. 13, a flow chart of the steps for training each of the artificial neural networks for each of the interlocks will be described.

At step 1305, each neuron of the weighted layer is assigned a random number between –1 and 1, having a mean value of zero, as initial weight (w).

At step 1310, for each ANN, the training input array for the test data set is multiplied by the weight array and is summed in a matrix operation. In a preferred embodiment, the inputs are supplied to the algorithm as a "5×z" matrix, where "z" is the number of time periods where test data is available. For example, an example input matrix is shown below in Table 8,

TABLE 8

| Input Test Data | $t_1$ | $t_2$ | $t_3$ | ... | $t_z$ |
| --- | --- | --- | --- | --- | --- |
| Interlock One | 0 | 0 | 0 | ... | 0 |
| Interlock Two | 0 | 0 | 1 | ... | 1 |
| Interlock Three | 0 | 1 | 0 | ... | 0 |
| Interlock Four | 0 | 1 | 1 | ... | 0 |
| Interlock Five | 0 | 0 | 1 | ... | 1 |

At step 1315, for each iteration, the sigmoid function is applied to derive a calculated output. At step 1317, for each iteration, the calculated output is subtracted from the training output to determine an error.

At step 1320, for each iteration, the error is multiplied by the derivative of the sigmoid function of the calculated output. At step 1325 the result is multiplied by the training inputs in a matrix operation, to derive an adjustment which complies with the error weighted derivative formula. In a preferred embodiment, the error weighted derivative formula is an algorithm based on gradient dissent. In this case, the derivative of the sigmoid function guarantees that the adjustment to each weight changes in a way that always decreases the error for the weight of each neuron.

At step 1327, the adjustment for each neuron is added to the current weight for that neuron.

At step 1330, the process is repeated for a preset number of iterations. In a preferred embodiment, the preset number of iterations is anywhere from 20,000 to 100,000. Other iterations counts can be used. A higher iteration count increases the accuracy of the node weights.

Once step 1330 is complete, the neural network is "trained".

At step 1340, live data for the failure of each interlock at a specified time in the future is input into the trained neural network. At step 1345, the output of each neural network ANN for each interlock is read to predict the output value. The output value then represents the predicated failure of any one interlock "n" at time ($t_c$).

An example of computer code written in python to perform the method is shown in FIG. 14.

Following are more detailed examples of how the interlocks work together in practice.

In Example 1, interlock 250 is activated when a temperature reading from temperature sensor 200 in stream 108 is received by interlock controller 201 that is at or below the pre-selected trip temperature of interlock controller 201. Interlock controller 201 will close valves 210, 212, 202, 206, 204, and 216 and stop pump 218. The remaining interlocks are not activated and the rest of the system operates as normal.

In Example 2, a temperature reading from temperature sensor 400 at or below the selected trip temperature is received by interlock controller 420, interlock 450 is activated. Interlock controller 420 closes valves 406 and 412. If the temperature of stream 178 is not sufficient to keep the temperature of stream 168 above the selected trip temperature for interlock controller 510, then interlock 550 is activated. Activating interlock 550 causes interlock controller 510 to open valve 502 and close valve 416.

In Example 3, a temperature reading from temperature sensor 600 is at or below the selected trip temperature for interlock controller 612 and is received by interlock controller 612, then interlock 650 is activated. Interlock controller 612 closes valve 602. If the temperature of stream 144 is not sufficient to keep the temperature of stream 148 above the selected trip temperature for interlock controller 310, then interlock 350 is activated. Interlock controller 310 then closes valves 306 and 308.

In Example 4, temperature sensor 600 reports a process temperature at or below the selected trip temperature for interlock controller 612. Interlock five 650 is activated. Interlock controller 612 closes valve 602. If the temperature of stream 144 is not sufficient to keep the temperature of stream 148 above the selected trip temperature for interlock controller 310, then interlock four 350 is activated. Interlock controller 310 then closes valves 306 and 308. Stream 158 to encounters a lower than normal operating temperature because stream 136 is effectively stops warming the cold box. As a result, the temperature reading from temperature sensor 400 may well be at or below the selected trip temperature of interlock three 450. If so, a temperature reading at or below the selected trip temperature is received by interlock controller 420, and interlock three 450 is activated. Interlock controller 420 then closes valves 406 and 412.

Once interlock three 450 is activated, if the temperature of stream 178 is not sufficient to keep the temperature of stream 168 above the selected trip temperature for interlock four 510, then interlock four 550 is activated. Activating interlock four 550 causes interlock controller 510 to open valve 502 and close valve 416. The activation of interlock two 350, interlock three 450, interlock four 550, and interlock five 650 means that less heat overall is supplied to cold box 100. If there is not sufficient heat to cold box 100 to keep the temperature of stream 108 above the selected trip temperature for interlock controller 201, then interlock one 250 is activated. Interlock controller 201 then closes valves 210, 212, 202, 206, 204, and 216 and stops pump 281, in order to prevent cold box shutdown and embrittlement of system components.

In a preferred embodiment, the master controller is a micro controller connected to the interlock controllers, pump controllers and temperature sensors through a local area network. In a preferred embodiment, the interlock controllers are by Triconex® of Schneider Electric SE of Rueil-Malmaison France.

In a preferred embodiment, valves 210, 216, 308, 406, 412, and 416 are full port on/off globe valves. However, other types of valves may be employed, such as gate valves, ball valves, or plug valves. Valves in the preferred embodiment are available from Velan of Montreal, Canada. The actuation systems for valves 210, 216, 308, 406, 412, and 416 are by Bettis® of Emerson Process Management of Houston, Tex. The trip solenoids attached to the actuation system are Model Nos. EV8007G1 and 258181-20 are by Asco® of Emerson Industrial Automation of Florham Park, N.J. The valve positioners connected to each valve in a preferred embodiment is Topworx™ Model No. DXP L12GNEB and is supplied by Emerson Automation Solutions of Louisville, Ky.

In the preferred embodiment, valves 204, 206, 208, 212, 224, 306, 414, 502, and 602 are full port process control valves. These valves and actuation systems are available from Fisher™ of Emerson Automation Solutions of Marshalltown, Iowa. The trip solenoids attached to the actuation systems are by Asco® of Emerson Industrial Automation of Florham Park, N.J. Valve positioners installed with the valve actuation systems are available from Topworx™ of Emerson Automation Solutions of Louisville, Ky.

In the preferred embodiment, actuation on the valve controllers 214, 220, 222, 226, 228, 302, 304, 408, 410, 506, and 604, is provided by pneumatic controllers which are set to fail closed upon loss of signal. However, other types of valve controllers and actuation, positioning and trip solenoids can be employed. It is preferred to have a redundant set of three valve controllers, each able to receive a signal and affect the position of the valve in response.

In the preferred embodiment, pump 218 is a multi-stage submersible pump manufactured by Sulzer of Winterthur, Switzerland. However, other pumps may be employed.

In the preferred embodiment, temperature sensors 200, 300, 400, 500, and 600 are manufactured by Smart Sensors Inc. of Houston, Tex. Digital displays and transmitters used by the sensor are manufactured by Rosemount™ of Emerson Process Management of Chanhassen, Minn. However, other temperature sensors and transmitters may be employed.

In the preferred embodiment, the ethylene production process includes a four stage propylene refrigeration system and an ethylene refrigeration system. However, other heating streams may be used, including a single, double, or triple stage propylene refrigeration systems. Further, the ethylene production process may employ other types of heat streams besides that disclosed. An ethylene refrigeration system. Similarly, the ethane and propane streams may flow through the cold box from different stages in the process.

The disclosed embodiment is one illustration of an interlock system with the use in an ethylene production process. A person skilled in the art will understand that other processes with similar temperature operating conditions and concerns can employ the same or similar interlock systems and methods as disclosed. Further, a person of skill in the art will understand that the components described as "protected" components can vary in system to system and so are disclosed as only examples of protected systems.

The invention claimed is:
1. An interlock system for a cold box, the cold box having a heating stream and a cooling stream, the interlock system comprising:
   a first interlock located on the heating stream, the first interlock comprising:
      a first temperature sensor;
      a first set of valves including a first valve;
      a first set of valve controllers including a first valve controller, wherein the first valve controller is operatively connected to the first valve;
      a first interlock controller operatively connected to the first set of valve controllers and programmed to:
         make a first comparison between a first temperature from the first temperature sensor and a first predetermined temperature;
         send a first signal to the first valve controller to change a position of the first valve based on the first comparison;
   a second interlock located on the cooling stream, the second interlock comprising:
      a second temperature sensor;
      a second set of valves including a second valve;
      a second set of valve controllers including a second valve controller, wherein the second valve controller is operatively connected to the second valve;
      a second interlock controller operatively connected to the second set of valve controllers and programmed to:
         make a second comparison between a second temperature from the second temperature sensor and a second predetermined temperature;
         send a second signal to the second valve controller to change a position of the second valve based on the second comparison; and,
   whereby changing the position of at least one of the first valve and the second valve avoids a cold box shutdown condition.
2. The interlock system of claim 1 further comprising:
   the first set of valves including a third valve;
   the first set of valve controllers including a third valve controller, wherein the third valve controller is operatively connected to the third valve;
   the first interlock controller programmed to:
      send a third signal to the third valve controller to change a position of the third valve based on the first comparison.
3. The interlock system of claim 1 further comprising:
   the second set of valves including a third valve;
   the second set of valve controllers including a third valve controller, wherein the third valve controller is operatively connected to the third valve;
   the second interlock controller programmed to:
      send a third signal to the third valve controller to change a position of the third valve based on the second comparison.
4. The interlock system of claim 1 further comprising:
   the second interlock further comprising
      a first set of pumps including a first pump;
      a first set of pump controllers including a first pump controller, wherein the first pump controller is operatively connected to the first pump;
      the second interlock controller, operatively connected to the first pump controller, and programmed to:
         send a third signal to the first pump controller to change the speed of the first pump based on the second comparison.
5. The interlock system of claim 4 wherein the second set of valves includes a third valve, a fourth valve, a fifth valve, a sixth valve, and a seventh valve:
   wherein, the second set of valve controllers includes a third valve controller, a fourth valve controller, a fifth valve controller, a sixth valve controller, and a seventh valve controller;
   wherein the third valve controller is operatively connected to the third valve, the fourth valve controller is operatively connected to the fourth valve, the fifth valve controller is operatively connected to the fifth valve, the sixth valve controller is operatively connected to the sixth valve, and the seventh valve controller is operatively connected to the seventh valve;
   the second interlock controller further programmed such that:
      when the second temperature is at or below the second predetermined temperature, a fifth signal is a signal sent to the second valve controller, the third valve controller, the fourth valve controller, the fifth valve controller, the sixth valve controller, and the seventh valve controller to close the second valve, the third valve, the fourth valve, the fifth valve, the sixth valve, and the seventh valve, and a sixth signal is a signal sent to the first pump controller to stop the first pump; and,
      when the second temperature is above the second predetermined temperature, the fifth signal is a signal sent to the second valve controller, the third valve controller, the fourth valve controller, the fifth valve controller, the sixth valve controller, and the seventh valve controller to open the second valve, the third valve, the fourth valve, the fifth valve, the sixth valve, and the seventh valve and the sixth signal is a signal sent to the first pump controller to start the first pump.
6. The interlock system of claim 1 wherein:
   the first interlock controller further programmed so that:
      when the first temperature is at or below the first predetermined temperature, the first signal is a signal to the first valve controller to close the first valve; and,
      when the first temperature is above the first predetermined temperature, the first signal is a signal to the first valve controller to open the first valve;
   the second interlock controller further programmed so that:
      when the second temperature is at or below the second predetermined temperature, the second signal is a signal to the second valve controller to close the second valve; and,
      when the second temperature is above the second predetermined temperature, the second signal is a signal to the second valve controller to open the second valve.
7. The interlock system of claim 1 further comprising:
   a third interlock located on the heating stream downstream of the first interlock, the third interlock comprising:
      a third temperature sensor;
      a third set of valves including a third valve;
      a third set of valve controllers including a third valve controller, wherein the third valve controller is operatively connected to the third valve;

a third interlock controller operatively connected to the third set of valve controllers and programmed to:
  make a third comparison between a third temperature from the third temperature sensor and a third predetermined temperature;
  send a third signal to the third valve controller to change a position of the third valve based on the third comparison; and,
whereby the changing the position of at least one of the first valve, the second valve, and the third valve avoids the cold box shutdown condition.

8. The interlock system of claim 7 wherein the heating stream comprises refrigeration system having a first stage, a second stage, a third stage, and a fourth stage, the first stage downstream of the second stage, the second stage downstream of the third stage, and the third stage downstream of the fourth stage; and wherein,
the first interlock is connected in line with the fourth stage; and,
the third interlock is connected in line with the third stage.

9. The interlock system of claim 7 further comprising:
the third set of valves including a fourth valve;
the third set of valve controllers including a fourth valve controller, wherein the fourth valve controller is operatively connected to the fourth valve;
the third interlock controller further programmed so that:
  when the third temperature is at or below the third predetermined temperature, the third signal is a signal to the third valve controller to close the third valve and a fourth signal is a signal sent to the fourth valve controller to close the fourth valve; and,
  when the third temperature is above the third predetermined temperature, the third signal is a signal to the third valve controller to open the third valve and the fourth signal is a signal sent to the fourth valve controller to open the fourth valve.

10. The interlock system of claim 7 further comprising:
the third set of valves including a fourth valve;
the third set of valve controllers including a fourth valve controller, wherein the fourth valve controller is operatively connected to the fourth valve;
the third interlock controller further programmed so that:
  when the third temperature is at or below the third predetermined temperature, the third signal is a signal to the third valve controller to close the third valve and a fourth signal is a signal sent to the fourth valve controller to open the fourth valve; and,
  when the third temperature is above the third predetermined temperature, the third signal is a signal to the third valve controller to open the third valve and the fourth signal is a signal sent to the fourth valve controller to close the fourth valve.

11. The interlock system of claim 7 further comprising:
a fourth interlock located on the heating stream downstream of the third interlock, the fourth interlock comprising:
  a fourth temperature sensor;
  a fourth set of valves including a fourth valve;
  a fourth set of valve controllers including a fourth valve controller, wherein the fourth valve controller is operatively connected to the fourth valve;
  a fourth interlock controller operatively connected to the fourth set of valve controllers and programmed to:
    make a fourth comparison between a fourth temperature from the fourth temperature sensor and a fourth predetermined temperature;
    send a fourth signal to the fourth valve controller to change a position of the fourth valve based on the fourth comparison; and,
whereby changing the position of at least one of the first valve, the second valve, the third valve, and the fourth valve avoids the cold box shutdown condition.

12. The interlock system of claim 11 further comprising:
the fourth set of valves including a fifth valve;
the fourth set of valve controllers including a fifth valve controller, wherein the fifth valve controller is operatively connected to the fifth valve;
the fourth interlock controller further programmed so that:
  when the fourth temperature is at or below the fourth predetermined temperature, a fifth signal is a signal sent to the fourth valve controller to close the fourth valve and a sixth signal is a signal send to the fifth valve controller to close the fifth valve; and,
  when the fourth temperature is above the fourth predetermined temperature, the fifth signal is a signal sent to the fourth valve controller to open the fourth valve and the sixth signal is a signal sent to the fifth valve controller to open the fifth valve.

13. The interlock system of claim 11 further comprising:
a fifth interlock located on the heating stream downstream of the fourth interlock, the fifth interlock comprising:
  a fifth temperature sensor;
  a fifth set of valves including a fifth valve;
  a fifth set of valve controllers including a fifth valve controller, wherein the fifth valve controller is operatively connected to the fifth valve;
  a fifth interlock controller operatively connected to the fifth set of valve controllers and programmed to:
    make a fifth comparison between a fifth temperature from the fifth temperature sensor and a fifth predetermined temperature;
    send a fifth signal to the fifth valve controller to change a position of the fifth valve based on the fifth comparison; and,
whereby changing the position of at least one of the first valve, the second valve, the third valve, the fourth valve, and fifth valve avoids the cold box shutdown condition.

14. The interlock system of claim 13 further comprising:
the fifth set of valves including a sixth valve;
the fifth set of valve controllers including a sixth valve controller, wherein the sixth valve controller is operatively connected to the sixth valve;
the fifth interlock controller further programmed so that:
  when the fifth temperature is at or below the fifth predetermined temperature, the fifth signal is a signal to the fifth valve controller to close the fifth valve and a sixth signal is a signal sent to the sixth valve controller to open the sixth valve; and,
  when the fifth temperature is above the fifth predetermined temperature, the fifth signal is a signal to the fifth valve controller to open the fifth valve and the sixth signal is a signal sent to the sixth valve controller to close the sixth valve.

15. The interlock system of claim 13 wherein the first predetermined temperature, second predetermined temperature, third predetermined temperature, fourth predetermined temperature, and fifth predetermined temperature are the same temperature.

16. The interlock system of claim 13 wherein the first predetermined temperature, second predetermined temperature, third predetermined temperature, fourth predetermined temperature, and fifth predetermined temperature are different temperatures.

17. The interlock system of claim 13 wherein the first predetermined temperature is between about −13° F. to about −23° F.

18. The interlock system of claim 1 wherein the cold box shutdown condition includes embrittlement of a component in ducted communication with the interlock system.

19. A system for monitoring a set of interlocks comprising:
a master controller, having a memory;
a set of interlock controllers operatively connected to the master controller;
a set of component controllers operatively connected to the set of interlock controllers and the master controller;
a set of temperature sensors operatively connected to the set of interlock controllers and the master controller;
a set of instructions, in the memory, that when implemented cause the master controller to carry out the steps of:
obtaining a temperature reading from a first temperature sensor of the set of temperature sensors;
comparing the temperature reading to a present temperature;
monitoring an activity state of a first interlock controller, of the set of interlock controllers, based on the comparison;
if the activity state indicates a failure, then setting the activity state to an override state; and,
setting a first component controller of the set of component controllers according to the override state.

20. The system of claim 19 wherein the set of instructions that when implemented further cause the master controller to carry out the steps of:
logging the activity state and the failure state of the set of interlocks at discrete time intervals in an activity table.

21. The system of claim 20 further comprising:
an artificial neural network, operatively connected to the master controller, having an input layer and an output layer; and,
the memory further comprises instructions that when implemented, causes the master controller to carry out the steps of:
training the artificial neural network with the activity table;
submitting a current set of failure states of the set of interlocks to the input layer; and,
reading a predictive set of failure states of the set of interlocks from the output layer.

* * * * *